US008713464B2

(12) United States Patent
Aides et al.

(10) Patent No.: US 8,713,464 B2
(45) Date of Patent: Apr. 29, 2014

(54) SYSTEM AND METHOD FOR TEXT INPUT WITH A MULTI-TOUCH SCREEN

(71) Applicant: Dov Nir Aides, Kiryat Tiv'on (IL)

(72) Inventors: Dov Nir Aides, Kiryat Tiv'on (IL); Alik Mokeichev, Tel Aviv (IL)

(73) Assignee: Dov Nir Aides, Kiryat Tiv'on (IL)

( * ) Notice: Subject to any disclaimer, the term of this patent is extended or adjusted under 35 U.S.C. 154(b) by 0 days.

(21) Appl. No.: 13/869,991

(22) Filed: Apr. 25, 2013

(65) Prior Publication Data

US 2013/0290894 A1 Oct. 31, 2013

Related U.S. Application Data

(60) Provisional application No. 61/640,335, filed on Apr. 30, 2012.

(51) Int. Cl.
*G06F 3/048* (2013.01)
*G06F 3/033* (2013.01)
*G06F 3/14* (2006.01)
*G06F 17/21* (2006.01)
*G06F 17/27* (2006.01)
*G06K 9/00* (2006.01)
*G06F 3/0488* (2013.01)
*G06F 17/22* (2006.01)

(52) U.S. Cl.
CPC ........ *G06F 3/04883* (2013.01); *G06F 3/04886* (2013.01); *G06F 17/2217* (2013.01); *G06F 17/273* (2013.01); *G06F 17/2735* (2013.01); *G06F 17/276* (2013.01)
USPC ........... 715/773; 715/754; 715/780; 715/863; 715/864; 704/9; 704/10; 382/187; 382/189

(58) Field of Classification Search
CPC ............ G06F 3/04883; G06F 3/04886; G06F 17/2217; G06F 17/273; G06F 17/2735; G06F 17/276
USPC ........ 715/754, 773, 780, 863, 864; 704/9, 10; 382/187, 189
See application file for complete search history.

(56) References Cited

U.S. PATENT DOCUMENTS

| | | | |
|---|---|---|---|
| 5,761,340 A * | 6/1998 | Suzuki ........................ 382/189 |
| 5,995,922 A * | 11/1999 | Penteroudakis et al. .......... 704/9 |
| 7,453,439 B1 | 11/2008 | Kushler et al. |
| 8,359,543 B2 | 1/2013 | Sengupta |
| 2003/0165801 A1* | 9/2003 | Levy ............................. 434/227 |
| 2004/0140956 A1* | 7/2004 | Kushler et al. ................ 345/168 |
| 2005/0105781 A1* | 5/2005 | Sakamoto et al. ............ 382/119 |
| 2005/0146508 A1* | 7/2005 | Kirkland et al. .............. 345/169 |

(Continued)

OTHER PUBLICATIONS

Zhao et al., "Simple vs. Compound Mark Hierarchical Marking Menus," 17th Annual ACM Symposium on User Interface Software and Technology, 2004, 10 pages.*

*Primary Examiner* — Tadeese Hailu
*Assistant Examiner* — Eric J Bycer
(74) *Attorney, Agent, or Firm* — Sorokor Agmon

(57) ABSTRACT

A method of inputting a text word in a computerized system using a virtual keyboard, including, recording two or more strokes; wherein each stroke forms contact with the virtual keyboard and maintains contact forming a trace path as it traverses through multiple keyboard keys, each key representing a letter; identifying the word based on the recording; and wherein every distinct letter in the word is represented by a key in one of the trace paths.

18 Claims, 19 Drawing Sheets

(56) References Cited

U.S. PATENT DOCUMENTS

| | | | |
|---|---|---|---|
| 2006/0277029 A1* | 12/2006 | Green et al. | 704/4 |
| 2006/0293880 A1* | 12/2006 | Elshishiny et al. | 704/10 |
| 2009/0213081 A1* | 8/2009 | Case, Jr. | 345/173 |
| 2011/0037718 A1* | 2/2011 | Stephanick et al. | 345/173 |
| 2012/0036469 A1* | 2/2012 | Suraqui | 715/773 |
| 2012/0303355 A1* | 11/2012 | Liu et al. | 704/9 |
| 2013/0046544 A1* | 2/2013 | Kay et al. | 704/275 |
| 2013/0249818 A1 | 9/2013 | Zhai et al. | |

* cited by examiner

SYSTEM AND METHOD FOR TEXT INPUT WITH A MULTI-TOUCH SCREEN

RELATED APPLICATIONS

The present application claims priority under 35 U.S.C. 120 from provisional application No. 61/640,335 titled "System and Method for Text Input with a Multi-Touch Screen", filed on Apr. 30, 2012. The disclosure of which is incorporated herein by reference.

TECHNICAL FIELD

The present disclosure relates generally to electronic devices having a multi-touch sensitive input device, and more particularly wherein the multi-touch sensitive input device implements a keyboard for text input.

BACKGROUND

The practice of inputting text to electronic devices, for example to form text documents or to send messages over communication networks has become generally widespread. Initially devices for inputting text were stationary and included large keyboards for inputting the text conveniently. In recent years the use of mobile devices has become more common and the size of the devices has been reduced significantly. Likewise the size of the keyboards for text input has been reduced.

As the size of the device has been reduced it has become desirable to reduce the size of the keyboard, for example by implementing a keyboard having a touch sensitive surface instead of mechanical keys. Commonly, the touch sensitive surface is combined with the display resulting in a touch screen that serves also for input and also for output. Typically, the device includes a display that is touch sensitive and a keyboard is virtually shown on the display. Users can select a key with their fingers by touching the display at the position in which the key is displayed. Due to the reduced size of the device some devices recommend using a pointing device such as a stylus or special pen to aid in accurately selecting keys.

Generally, when dealing with methods for inputting text into the device the issues of speed, accuracy and convenience need to be taken into consideration. Users are interested in quickly, comfortably and easily entering text without having to pause to assure accurate alignment to make sure that the keys are pressed exactly in the center.

In U.S. Pat. No. 7,453,439 to Kushler dated Nov. 18, 2008 there is described a method of using a touch sensitive keyboard for text input. In the disclosed method a user inputs words by forming contact with the keyboard using their finger or a stylus. The user forms contact with the touch sensitive keyboard by selecting the first letter of the word and then sliding from letter to letter in sequence to trace out all the letters of the word. The user only lifts the finger or stylus after the last letter. The intended word is determined based on the trace path also referred to as an input path. This method increases text input speed since:

1. The keyboard is constant so the user is accustomed to the positions of the letters;
2. The user's stylus or finger slides from letter to letter and does not need to be lifted, lowered, and positioned on each letter;
3. The letters do not need to be pressed accurately, rather it is sufficient to pass directly through the region defined for a key associated with the letter, and thus the user can move through the letters faster.

The method uses a word database to identify one or more words that best fit the input path. Generally the input path reflects a sequence of points that can each be associated with a key that may or may not participate in the word that was intended by the user. The disclosure suggests comparing the words from the database with the associated keys and determining the words that best fit the path. The disclosure specifies that the identification process is based on a number of important constraints, which must be followed, the constraints including:

1. Matching the first letter of the word with a "pen-down" action wherein the stylus first contacts the touch sensitive keyboard;
2. Matching the last letter of the word with a "pen-up" action wherein the stylus leaves the surface of the touch sensitive keyboard;
3. Matching the sequence of letters in the spelling of the word with the sequence of letters deduced from the input path.

The above method was implemented in a product called Swype for use on mobile phones. The product was shown to indeed increase input speed and was demonstrated to set a Guinness world record regarding the speed for inputting a text message on a touch screen mobile phone.

SUMMARY

An aspect of an embodiment of the disclosure relates to a system and method for inputting a text word into an electronic device. The device includes a virtual keyboard that enables a user to stroke the keyboard with fingers or pointing devices and form trace paths across the keyboard that traverses multiple letters. The user can stroke the keyboard to form multiple trace paths simultaneously, sequentially or partially overlapping temporally and/or spatially. The multiple trace paths are combined to serve as a recording that identifies the letters of the word that the user is interested in inputting. The word is identified by locating a word from a word database in which all the distinct letters of the word were represented by keys that were traversed by the user in the recording. Optionally, letters that appear more than once in the word may be selected only once or may be selected more than once to match their appearance in the word.

In an exemplary embodiment of the disclosure, the first letter of the word will be the first letter in the trace path with the earliest starting time. Optionally, the user is required to traverse all the letters of the word in their order of appearance in the word, so that the time of selection will identify their order regardless of the trace path in which they were selected. Alternatively, it is sufficient that the user select the letters in each trace path in the correct order, but letters in one trace paths can be selected before the letters of another trace path even if they follow them in the word. In some embodiments of the invention, the user can select the letters of the word in any order.

In an exemplary embodiment of the disclosure, the trace paths overlap each other temporally, for example the user may select keys on two sides of a virtual keyboard simultaneously or sequentially by placing a finger in contact with each side to select a first letter on each side and then sliding his fingers from letter to letter according to the order of the letters in the word the user is spelling. Optionally, trace paths may overlap spatially, for example by crossing over the same area on the virtual keyboard at different times to reach letters.

In an exemplary embodiment of the disclosure, the system may determine which of the letters that were traversed actually participate in the word with a higher probability by detecting landmark keys. Optionally, the keys representing the first letters in each path and the last letters in each path will be considered landmark keys. Additionally, letters represented by keys wherein the trace path traverses them and then makes a significant change in its direction are also considered landmark letters. Optionally, letters that the user paused on them for a significant amount of time relative to other letters will be considered landmark letters.

In an exemplary embodiment of the disclosure, when searching for a match between the recording and the words from the word database, the words in the database will narrowed down by only leaving words that include all the letters represented by the landmark keys.

In an exemplary embodiment of the disclosure the method is implemented on mobile telephones, touch pad computers, and small sized electronic devices. Alternatively or additionally, the method can be implemented on any computer or device having a processor and memory that requires text input.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1A:
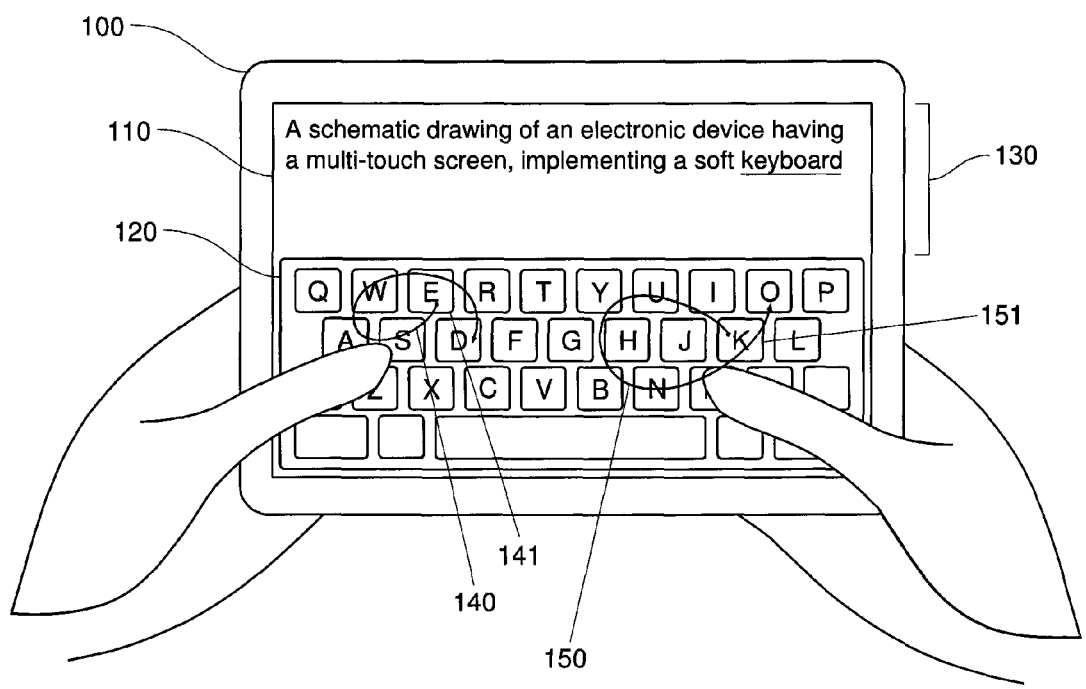
FIGS. 1A-1E are schematic illustrations of inputting text to an electronic device with a virtual keyboard, according to an exemplary embodiment of the disclosure.

FIGS. 1A-1E are schematic illustrations of inputting text to an electronic device 100 with a virtual keyboard 120, according to an exemplary embodiment of the disclosure. In an exemplary embodiment of the disclosure, electronic device 100 includes a touch screen 110 for displaying text on a text display area 130. The text is input using the virtual keyboard 120 that is displayed on touch screen 110. In some embodiments of the disclosure virtual keyboard 120 is a virtual soft keyboard that is displayed by software on touch screen 110. Alternatively, virtual keyboard 120 may be physically printed on touch screen 110. In some embodiments of the disclosure, virtual keyboard 120 may be a virtual keyboard that is displayed by illuminating light and recording hand motions of a user. Optionally, virtual keyboard 120 is capable of recording the details of multiple points of contact simultaneously. Optionally, virtual keyboard 120 can identify different types of action, for example:

1. A "pointer down" action wherein the user makes initial contact with the virtual keyboard 120;
2. A "pointer up" action wherein the user releases contact from the virtual keyboard 120; and
3. A "pointer move" action wherein the user continuously is in contact with the virtual keyboard 120 moving from one point to another.

In an exemplary embodiment of the disclosure, electronic device 100 is continuously sampling to detect user contact with touch screen 110. Optionally, for every contact point identified by device 100 the device records a "pointer" that is a data structure including the type of action, coordinates, time and other details that may be supported by the virtual keyboard 120, for example contact intensity.

In an exemplary embodiment of the disclosure, the action of forming contact with the virtual keyboard 120 is referred to as a stroke, wherein a keystroke is a stroke activating a single keyboard key and a sweep is a stroke that traverses several keyboard keys in sequence.

In an exemplary embodiment of the disclosure, electronic device 100 is capable of recording multiple pointers simultaneously, so that the user can input words using one or more strokes that may or may not overlap temporally and/or spatially, for example the user may place one finger on one side of virtual keyboard 120, a second finger on the other side and trace a path of points with each finger traversing the location of one or more keys. Optionally, the fingers may move simultaneously or they may move one after another, for example each side sliding across the virtual keyboard 120 to pass through the region of desired keys representing the letters needed to spell a word. In an exemplary embodiment of the disclosure, the paths may cross over the same area of virtual keyboard 120 at different times. Optionally, one finger may be lifted up and moved to a new location to trace an additional path while the other finger remains in contact with the virtual keyboard 120, thus forming three or more trace paths. In an exemplary embodiment of the disclosure, the user aims to form multiple trace paths that traverse the keys representing every letter of the word the user is interested in inputting. In some embodiments of the disclosure the user may use three or more fingers to form the multiple trace paths.

Once the user releases all fingers or strokes a delimiter key electronic device 100 records all the trace paths as a recording and searches for the most probable word that matches the keys selected by all the trace paths in the recording. Optionally, during creation of the trace paths electronic device 100 may begin processing and even offer words based on the current position of the users fingers as if the current position is the final position. In some embodiments of the disclosure, device 100 may accept as a recording multiple trace paths even if they do not overlap temporally until a delimiter key is selected or until a pre-selected amount of time passes from input of the last pointer. Optionally, during the user input or at least once a recording is completed words from a database of words will be compared with the recording to identify the word intended by the user. In an exemplary embodiment of the disclosure, the word can be computed during the input process by computing the possible words based on the input up to the specific moment or even based on a guess as to the further letters the user will select, to reduce computation time once the end of input is determined. Optionally, the user may select a word that is presented to him instead of completing the input process of all the letters of the word.

In an exemplary embodiment of the disclosure, the compared words will be given a relevancy score and the most relevant word will be selected. Optionally, one or more words having the highest scores will be displayed to the user, so that the user may select the most appropriate word.

The standard keyboard layout (QWERTY) was initially designed for two handed input wherein the letters were positioned based on letter frequency in words of the input language. The use of multiple trace paths commencing at a different location on virtual keyboard 120 allows the user to exploit the benefit of the standard keyboard layout to increase input speed and reduce the combined length of the trace paths. As anticipated by the inventor and verified by experimentation the use of multiple trace paths to input text enabled text input exceeding the world record set by the users of prior art systems forming a single trace path.

FIG. 1A illustrates input of the word "keyboard" with two strokes 140, 150. In an exemplary embodiment of the disclosure, the user starts the first stroke 150 with the right hand thumb, by contacting virtual keyboard 120 near the keyboard key corresponding to the letter 'k' 151. The user then starts the second stroke 140 with the left hand thumb to input the letters of the word in their order of appearance in the word, by contacting the virtual keyboard 120 near the keyboard key corresponding to the letter 'e' 141. The user continues the first stroke through the vicinity of the keyboard keys corresponding to the letters 'y', 'b' and 'o', and the second stroke through the vicinity of the keyboard keys corresponding to the letters 'a', 'r' and 'd'. Once the user detaches both thumbs from the virtual keyboard 120, electronic device 100 analyzes the two strokes and outputs the word 'keyboard' into the text output area 130. In an exemplary embodiment of the disclosure, each key is recorded with a time value, to help determine the order of the letters.

Figure 1B:
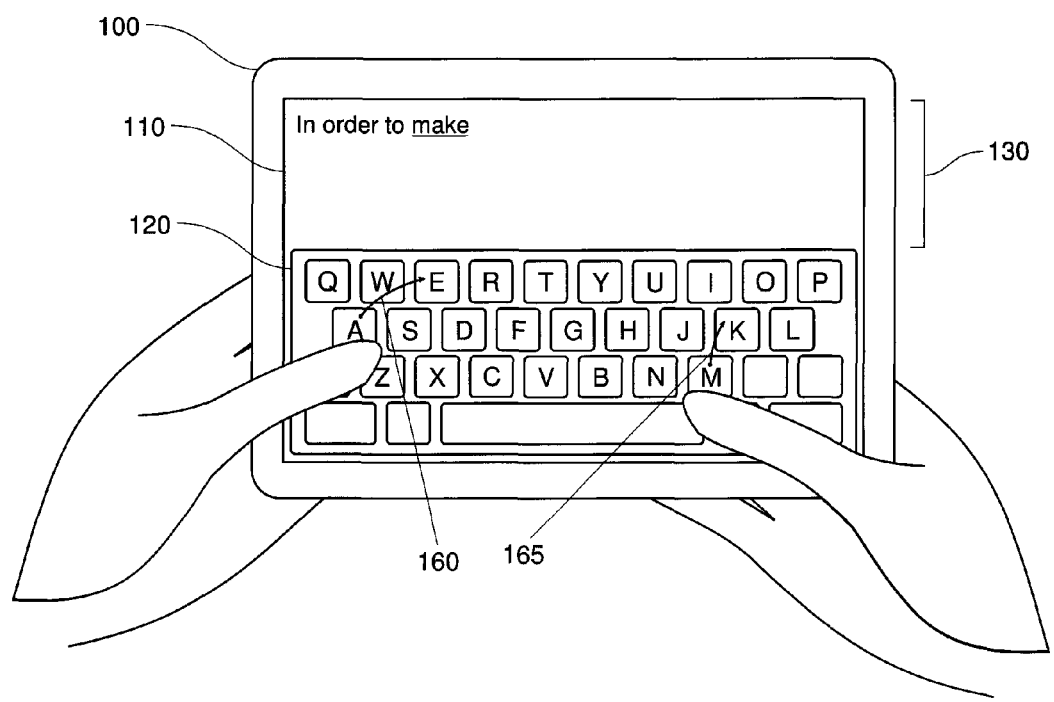

FIG. 1B illustrates input of the word "make" with two strokes 160, 165. In an exemplary embodiment of the disclosure, the letters of a word are input by the user in their correct order, by inputting the letter 'm' with the first thumb then inputting the letter 'a' with the second thumb. Afterwards the letter 'k' is input with the first thumb and the letter 'e' is input with the second thumb. In some embodiments of the disclosure, the user only needs to input the letters in their correct order in each stroke. Optionally, one stroke may be completed before the other starts. Accordingly, experienced users may become accustomed to select the first letter with one finger and then selecting letters simultaneously from both trace paths using two fingers, for example in FIG. 1B the user may input the letter in the following orders ('m', 'k', 'a', 'e'), ('m', 'a', 'k', 'e') or ('m', 'a', 'e', 'k'). Alternatively, the user may traverse through all the letters on one side and then traverse through the letters on the other side.

Figure 1C:
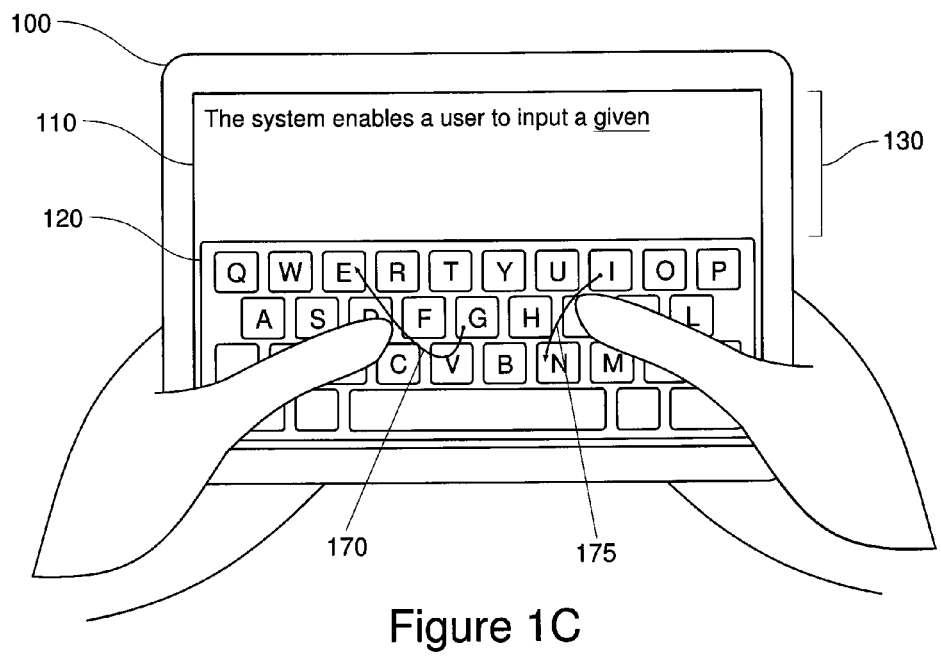
Figure 1D:
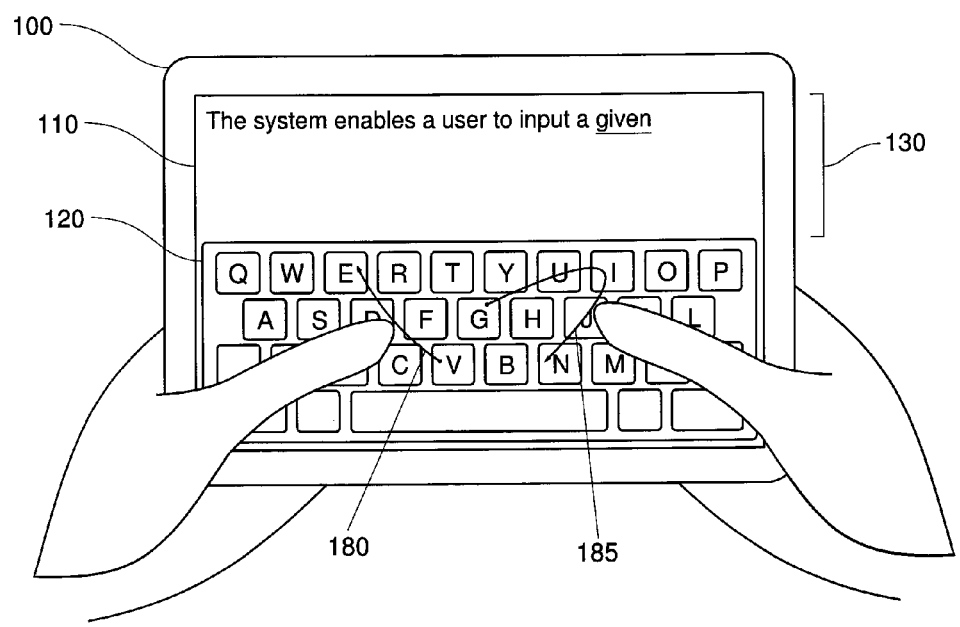

FIG. 1C illustrates input of the word "given" with two strokes 170, 175 whereas FIG. 1D illustrates input of the word "given" with different input strokes 180, 185. In an exemplary embodiment of the disclosure, the user selects the first letter 'g' with one finger and then can select all the letters from one side (e.g. ('g', 'v', 'e') 170 or ('g','i','n') 185) or the letters from the other side (e.g. ('i', 'n') 175 or ('v', 'e') 180) or interweave the selection of letters (one or more from each side), as long as each stroke traverses the letters of the word in that stroke in their correct order as appearing in the intended word. Optionally, the selection of which keys will be in the first stroke and which in the second stroke is unimportant. Generally the decision by the user to include or exclude a letter from a specific stroke is based on the keyboard position of each letter relative to the other letters in the word. Optionally, electronic device 100 is also tolerant of the geometric accuracy of the trace path. The path does not need to accurately pass through the center of each key, it is only sufficient that trace path pass in the vicinity of the desired key for it to be included in the path.

In some embodiments of the disclosure, as long as the user does not release contact with all fingers from the virtual keyboard 120 the user may add additional trace paths to serve as part of a word. Once the user releases contact device 100 will analyze the trace paths to find the intended word. Optionally a space is added when starting a new word to relieve the user from the need to keystroke the space explicitly when inputting text.

Figure 1E:
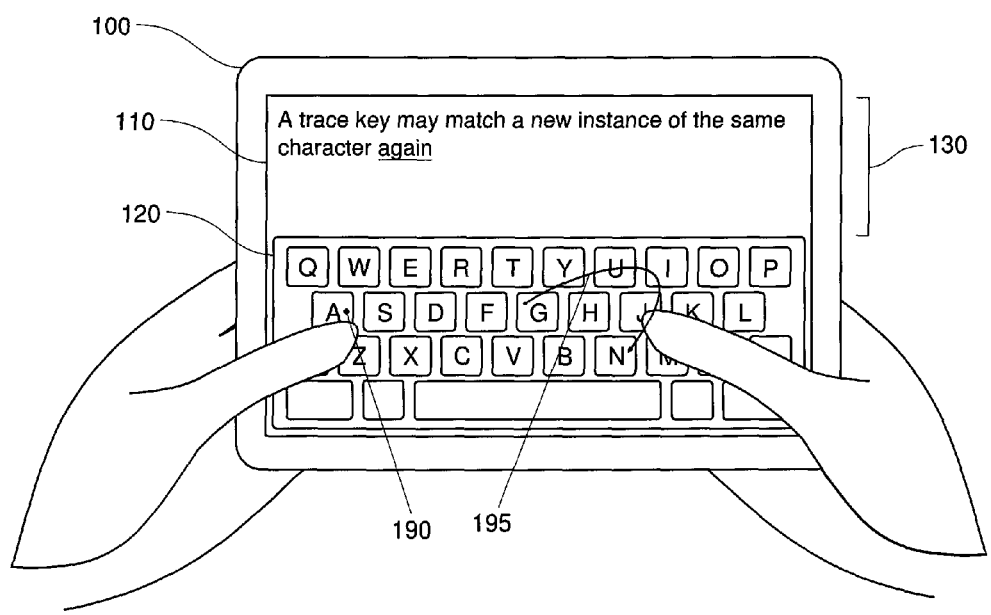

FIG. 1E illustrates input of the word "again" with two strokes 190, 195. Optionally, the letter 'a' that is input by stroke 190 serves to match all appearances of the letter 'a' in the compared words, so that all the letters of the word are matched by the user's strokes.

Figure 2:
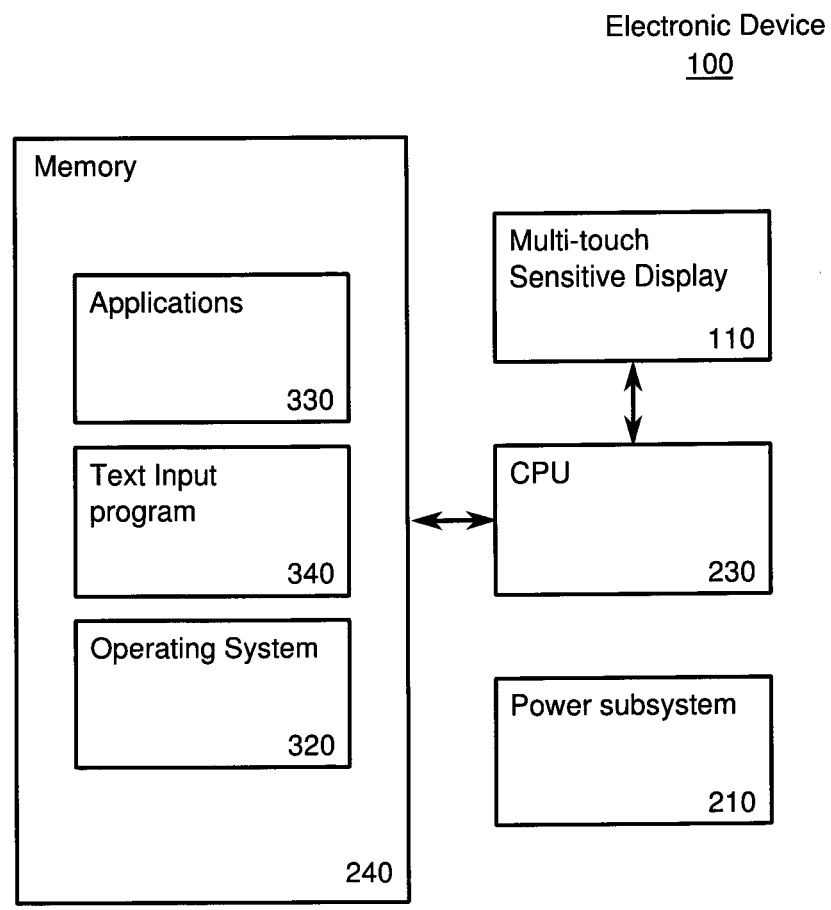
FIG. 2 illustrates a simplified block diagram of an electronic device, according to an exemplary embodiment of the disclosure.

FIG. 2 illustrates a simplified block diagram of electronic device 100, according to an exemplary embodiment of the disclosure. Optionally, electronic device 100 may be a mobile phone, a touch pad, a laptop computer, a desktop computer or other computerized devices having a touch screen to allow text input. In some embodiments of the disclosure, electronic device 100 may input text from a virtual keyboard by analyzing hand motions of the user in the air. The hand motions serving as a form of contact with electronic device 100 without actually touching a screen, for example to input text into a smart TV remotely. Optionally, the keyboard may be displayed on a surface, in the air (e.g. using lights) or on a remote screen (e.g. a large TV screen or illuminated on a wall). In some embodiments of the disclosure, hand motions may be used to indicate the beginning and/or end of a stroke, for example by closing the users hand to form a fist. Alternatively, other hand gestures may be used to signify the beginning and/or end of input.

In an exemplary embodiment of the disclosure, electronic device 100 includes a central processing unit (CPU) 230 for executing commands, and a memory 240 for interacting with central processing unit 230. Memory 240 may include a controller, high speed random access memory, read only memory, and non-volatile memory elements such as a flash memory, solid state memory or other types of memory. Optionally, electronic device 100 includes programs 320, 330 and 340 which are made up from sets of instructions stored in memory 240 and configured to be executed by CPU 230. In an exemplary embodiment of the disclosure the programs include an operating system 320 to control functionality of the device, a text input program 340 to control text input and word output. Additionally, the programs may include other applications 330 to provide other services that require text input and/or text output, for example a text editor for processing word documents, an email application to send text messages and other applications.

As explained above, electronic device 100 optionally includes touch screen 110. Touch screen 110 serves as the output interface for displaying information to the user. Additionally, touch screen 110 serves to receive input from the user. Optionally, electronic device 100 may display a keyboard on touch screen 110 to implement virtual keyboard 120 for the user to input text to electronic device 100.

In an exemplary embodiment of the disclosure, electronic device 100 also includes a power subsystem 210 for powering the device. Optionally, power subsystem 210 may include a battery, a recharging module and any other required components for powering electronic device 100.

Figure 3:
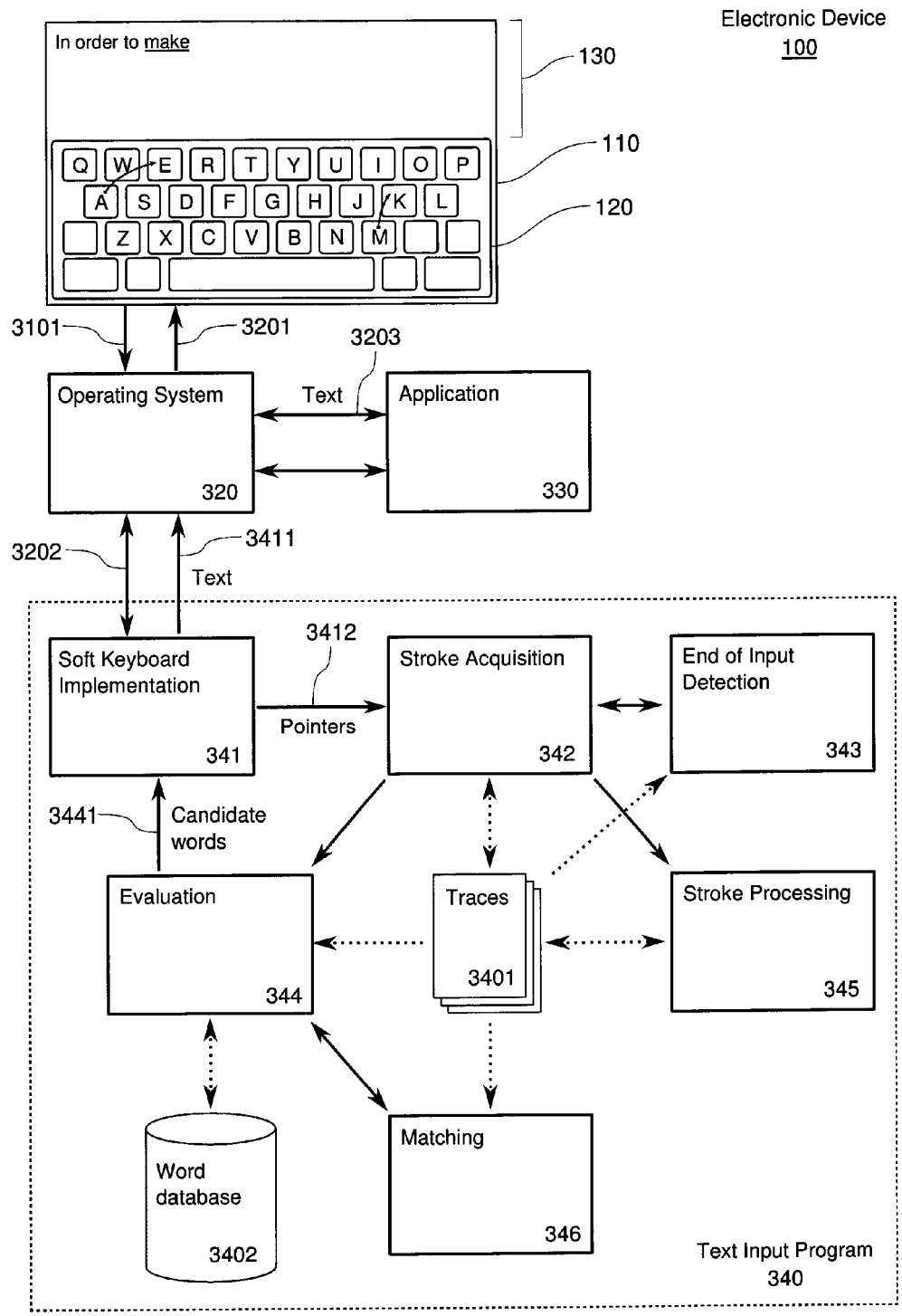
FIG. 3 illustrates a simplified data flow diagram during use of an electronic device, according to an exemplary embodiment of the disclosure.

FIG. 3 illustrates a simplified data flow diagram during use of electronic device 100, according to an exemplary embodiment of the disclosure. In an exemplary embodiment of the disclosure, operating system 320 controls the input and output from electronic device 100, through the use of touch screen 110, which includes virtual keyboard 120. Optionally, the other software applications 330 and text input program 340 communicate indirectly with the input/output of electronic device 100 and with each other by calling operating system application program interfaces (APIs).

In an exemplary embodiment of the disclosure, operating system 320 and/or application 330 display the input-text in the text display area 130 of touch screen 110. Optionally, they may provide additional functionality, for example, text editing and storing of the text in memory 240.

In an exemplary embodiment of the disclosure, text input program 340 includes a soft keyboard implementation 341 that handles general soft keyboard functionality, for example, initialization, displaying a soft keyboard on touch screen 110, responding to keystrokes, showing words and responding to candidate word selection, and so forth. The details of operating system 320, and the specific implementation details of application 330 to display text on touch screen 110, and utilize a general virtual keyboard 120 may vary between different operating systems 320 and electronic devices 100 as known in the art.

In an exemplary embodiment of the disclosure, text input program 340 includes in addition to the soft keyboard implementation 341, a stroke acquisition module 342 that includes an end of input detection method 343, a stroke processing module 345, and an evaluation module 344. The evaluation module 344 includes a matching method 346, receives trace data structure(s) 3401 that represent the details of a trace path and a database of words 3402. Optionally, to input a new word, the user strokes virtual keyboard 120 of touch screen 110. As the user strokes touch screen 110, touch screen 110 generates touch data that is received 3101 by operating system 320. The operating system 320 transforms the touch data and sends it 3202 to the text input program 340. In an exemplary embodiment of the disclosure, soft keyboard implementation 341 receives 3202 the touch data from the operating system 320 and may send 3411 corresponding characters to the operating system 320 for display in the text display area 130 as with any keyboard. Optionally, the soft keyboard implementation 341 additionally sends 3412 touch data as a sequence of pointers to the stroke acquisition module 342 and may receive 3441 a list of corresponding candidate words from evaluation module 344.

In an exemplary embodiment of the disclosure, soft keyboard implementation 341 may then send 3411 one or more words from the list of candidate words to display in text display area 130, or to replace previously sent characters, if any. It is noted that the interaction between the soft keyboard implementation 341 and the other modules of text input program 340 that are involved in processing the sequence of pointers into candidate words, may be seen as resembling the interaction between a soft keyboard and a spelling correction and/or automatic word completion component, for example, the soft keyboard implementation 341 may send input data to a correction component, which generates a list of candidate corrections, that are used to replace previously output characters, automatically or after selection by user.

In an exemplary embodiment of the disclosure, each pointer from the sequence of pointers includes an id associating it with a particular stroke, the contact location of the pointer on touch screen 110, the time of contact, and an action, for example, a pointer-down to signal the start of a stroke, and a pointer-up to signal the end of a stroke. Optionally, the operating system 320 transforms the touch data to the sequence of pointers, or provides the text input program 340 with enough information to compute the transformation by way of an appropriate process. In an exemplary embodiment of the disclosure, stroke acquisition module 342 receives 3412 each pointer and progressively creates a recording, which serves to identify a matching word. The recording is made up from a collection of trace data structures 3401, wherein each trace data structure 3401 represents a single stroke that forms a trace path. Each recording can be made up from one or more strokes, for example one, two, three or more strokes. In each stroke a user places his or her finger on virtual keyboard 120, slides over virtual keyboard 120 to form a trace path that is sampled by electronic device 100 as a sequence of pointers and then releases his or her finger. Optionally, a trace path may represent a single keystroke or multiple keys.

Stroke acquisition module 342 calls stroke processing module 345 to analyze the pointer and update the corresponding trace. The stroke acquisition module 342 calls the detect-end-of-input method 343 to detect if the user finished inputting all strokes for a word. Once it detects the end of input for a word it may call the evaluation module 344 to process the recording. In some embodiments of the disclosure, analysis of the input may begin during input based on finished strokes or partial strokes to increase response time. In an exemplary embodiment of the disclosure, the end of input is determined when the user entirely releases contact from virtual keyboard 120 with all fingers, for example the user may trace a first path with one finger and keep the finger in contact with virtual keyboard 120 while tracing additional paths with other fingers. Alternatively or additionally, the end of input may be determined once the user traverses a delimiter key, for example blank, period, comma, question mark or other nonletter keys. Further alternatively or additionally, the end of input may be determined by a pre-selected time interval passing from the moment the virtual keyboard is released, thus a user may sequentially trace paths as long as the transition from one trace path to another is performed quickly. Once the user pauses more than the predetermined time electronic device 100 will assume that the recording is finished and provide words that match the recording.

In an exemplary embodiment of the disclosure, evaluation module 344 iterates a database of words 3402 and forms a list of detected database words that may match the recording. For each detected database word the evaluation module calls the match method 346 to compute if and how well the word matches the recording 3401; the evaluation module may adjust the matching score of each matched database word using various considerations, for example, word frequency and language model. Optionally, the evaluation module sorts the list of matched database words by their score and sends 3441 the list to soft keyboard implementation 341 as a list of candidate words. In an exemplary embodiment of the disclosure soft keyboard implementation 341 may modify the list of words depending on its mode of operation, for example, it may capitalize the first letter of each word or capitalize all letters. The soft keyboard implementation may additionally present words from the list of candidate words to the user for selection. Optionally, soft keyboard implementation 341 may then send 3411 the highest-ranking candidate word or the user-selected candidate word to the operating system, which will send it in turn to the application 330. The application displays the text in the text display area 130 of the multi-touch screen 110. In an exemplary embodiment of the disclosure, soft keyboard implementation 341 may send delimiters automatically, for example after sending a candidate word, in response to subsequent input by the user.

In an exemplary embodiment of the disclosure, electronic device 100 may provide a process for the user to add new words to the database of words 3402, for example, by accepting input of a word letter by letter with keystrokes. Optionally, electronic device 100 displays a user interface to add the word spelled by the user to the database of words 3402 with predefined properties selected by the user or defined automatically.

In an exemplary embodiment of the disclosure, the user performs one or more strokes; each stroke forms a trace path that traverses a sequence of keyboard keys optionally including a start key, and a sequence of keys. In some embodiments of the disclosure, the trace path may also be analyzed to identify an end key. Electronic device 100 forms a recording with the multiple trace paths and analyzes the recording to match a word to the recording from word database 3402. In an exemplary embodiment of the disclosure, the user is required to essentially select the keys in all paths or at least in each path according to their order in the word. Although in some embodiments of the disclosure neighboring keys may be interchanged as explained below. Optionally, the user can select the first letter in the word with a first hand, for example with the thumb of the right hand. Then the second letter with the other hand, for example the thumb of the left hand. Optionally, the user can then select each proceeding letter with either the right hand or the left hand in the correct order as they appear in the word or at least so that the letters of each path are in the correct order of appearance in the word. Electronic device 100 is then expected to identify the word intended by the user taking into account the order of selection in each path. It should be noted that there may be more than two trace paths, for example the user may release one hand and continue to form a new trace path from a new location or form another trace path with a different finger. In some embodiments of the disclosure, it will be assumed that a path that entirely follows a different path temporally (i.e. no temporal overlap) all the letters in the later path will be after the letters of the earlier path. Optionally, evaluation module 344 will accept the traces of the recordings and interweave the letters from the trace paths to identify the word.

In an exemplary embodiment of the disclosure text input program 340 overcomes a few problems in identifying the letters intended by the user and the desired word:
1. The trace paths generally also traverse keys that represent letters that are not part of the word since they are in the path when sliding from one required letter to another.
2. The user may form a path that does not accurately pass through the exact center of each required key thus making it unclear which key was intended, for example two or more neighbor keys that are close to a pointer on the trace path.
3. The user may inadvertently swap the order of keys or swap the order of keys to increase input speed.
4. The sampling rate/accuracy of electronic device 100 may not provide enough pointers to accurately identify the exact sweep path taken by the user; or electronic device 100 may provide too many pointers so the pointers cannot be relied upon to determine the users intentions in selecting letters.
5. There may be many possible permutations to interweave the keys from multiple trace paths.

In an exemplary embodiment of the disclosure, to handle these problems, electronic device 100 interpolates a complete trace path. Then all possible keys along the path are identified. Optionally, electronic device 100 may calculate the distance from the center of each key to the interpolated path to decide which key or keys will be considered to be part of the path. In an exemplary embodiment of the disclosure, start keys, end keys and keys where the trace path took a significant change in direction may be considered landmark keys having a higher probability of being the actual keys intended by the user. Optionally, also keys that the user paused on for significantly more time than other keys may be considered landmark keys.

In an exemplary embodiment of the disclosure, electronic device 100 will form a trace key data structure for each key along the trace path. Optionally, the data structure will record for each key the following information:
1. Neighboring keys that could possibly be intended by the user instead of the selected key thus allowing the interchange of neighboring keys;
2. A distance of the key and the neighboring keys from the pointers of the trace path;
3. If the key is a landmark key or not;
4. A path index to identify the associated pointer leading to the identification of the key;
5. The time or time interval during which the key was selected.

In an exemplary embodiment of the disclosure, each stroke of the user will be represented by a trace data structure that includes:
1. A trace path made up from a sequence of pointers identifying the location of the stroke path as a function of time.
2. A sequence of trace keys as described above resulting from the trace path;
3. A start time;
4. An end time.

As explained above the recording may include multiple trace paths representing multiple strokes. During creation of the recording or at least once a recording is entirely defined electronic device 100 analyzes the input to determine what word is represented by the recording. In an exemplary embodiment of the disclosure, word database 3402 includes a collection of words that are used to identify the word intended by the user. In some embodiments of the disclosure each word is provided with a score representing its frequency in the language being dealt with. Optionally, more frequent words will be given preference before less popular words.

In an exemplary embodiment of the disclosure, the words can be narrowed down by limiting them to words including the first and/or optionally also the last letters that were determined to be possible in the recording. The possible letters may include the neighbors of the keys that were identified as first and last.

In an exemplary embodiment of the disclosure, the words can be narrowed down to only include words, which include all the landmark keys and then comparing the remaining words with the recording. This option is referred to as a landmark cover. According to this option letters (or their neighbors), which most probably are in the word will be used to limit the words needed to be compared with the entire trace.

In an exemplary embodiment of the disclosure, the words can be narrowed down to only include words, in which all the letters of the word appear in the trace data structures in the recording. In this embodiment any word including letters that do not appear in the trace will be removed from the identification process. This option is referred to as a trace cover. Optionally, electronic device 100 may be programmed to allow one or more missing letters to take into account user errors.

It should be noted that although the user is expected to spell the word with all the letters in order at least in each stroke, according to the above method letters that are neighbors may be interchanged in a stroke since the trace includes keys and their neighbors. Additionally, since the process of identifying a word is statistical it is possible that electronic device 100 will identify words in which the user selected the letters in the wrong order.

In an exemplary embodiment of the disclosure, some keys may represent multiple letters, for example capital letters and small letters or letters with accents. Optionally, electronic device 100 needs to determine if the key selected by the user is referring to the main character represented by the key or to a secondary character. In an exemplary embodiment of the disclosure, in the matching process between the words of the word database 3402 and the selected keys, the words of the word database 3402 may be normalized to be compared using the main character, for example by changing capitals to small letters or by removing accents. Thus for example the word "Internet" will be matched using small letters and then displayed as initially appearing in word database 3402.

In some embodiments of the disclosure, double letters may be changed to single letters or even letters appearing more than once in a word may be removed for the comparison process. If the word is selected it will be displayed to the user in its correct—non-normalized form.

SUMMARY OF DEFINITIONS

The terminology used in this specification is for the purpose of describing clearly some possible embodiments of the subject matter but is not intended to be limiting of the disclosed subject matter. In particular, embodiments of the disclosed subject matter may use different definitions, concepts and/or data structures than those defined here.

A soft keyboard is a virtual keyboard implemented by the system and displayed on a multi-touch screen.

A keyboard key on a soft keyboard is used to input one main character (i.e. the character printed on the keyboard key) and possibly several auxiliary characters (for example, accentuated versions of the main character). For abbreviation, the flowcharts use the term key to mean keyboard key. The term should not be confused with trace key and landmark key that refer to types of data structures.

A stroke is the contact action of a user finger, a stylus, or a compatible device, with the touch screen.

A pointer is a data structure representing the contact location of a stroke with the multi-touch screen at a particular point in time.

Each keyboard key has an associated exclusive activation area. A pointer located within the boundary of the activation area of a keyboard key is said to activate the keyboard key, and the keyboard key is said to correspond to the pointer or to be activated by the pointer. The keyboard key corresponding to a pointer may be computed by way of any appropriate process.

A keystroke is a stroke activating a single keyboard key.

A sweep is a stroke traversing through several keyboard keys in sequence.

A trace is a data structure representing a single stroke that comprises a trace path, a sequence of trace keys, a start time, and an end time.

A recording is the collection of traces corresponding to a single input word. The trace with the latest end time in a recording is said to be the ending trace.

A trace path is the sequence of pointers representing the contact location of a stroke on the multi-touch screen through time.

A trace key is a data structure including data relating to a single keyboard key such as the corresponding keyboard key, associated neighboring keys, a flag indicating if it is a landmark key, and a path index into the trace path indicating a corresponding pointer.

The landmark keys are a subset of the trace keys of a trace, comprising, the first trace key, the last trace key, and trace keys corresponding to significant changes in the direction of the stroke path.

The neighboring keys associated with a trace key are the set of keyboard keys in a defined vicinity of the stroke location as it traversed through the keyboard key corresponding to the trace key. The set includes the keyboard key.

The neighboring keys of a pointer are the set of keyboard keys in a defined vicinity of the pointer. The set includes the keyboard key.

A start key is a neighboring key associated with the first trace key of the trace with the earliest start time in a recording.

An end key is a neighboring key associated with the last trace key of any trace with an end time later than the start time of the ending trace of a recording.

A normalized word is a transformation of a word in which each character is mapped to the main character of the keyboard key used to input it, and characters that do not map to an alphabet letter are discarded.

Landmark cover: A normalized word w is a landmark cover of a collection of traces $s_r$, if for each landmark key k in a trace in $s_r$, there exists a character c in w, such that c is the main character of a neighboring key of k.

Trace cover: A collection of traces $s_t$ is a trace cover of a normalized word w, if for each character c in w, there exists a trace key k in a trace in $s_r$, such that c is the main character of a neighboring key of k.

The description includes pseudo-code describing the logic of exemplary embodiments of the subject matter. The pseudo-code is for the purpose of describing clearly some possible embodiments of the subject matter but is not intended to be limiting of the described subject matter. In particular, the logic of certain embodiments of the disclosed subject matter may correspond to different pseudo code.

Additionally or alternatively, the pseudo code included in the current description may not be complete and may imply details. For example, where the pseudo-code describes the creation of a new data structure, the fields of the data structure may be assumed initialized to default values, such as zero for scalars and empty collections for lists, sets and maps. Additionally, the scope, initialization and definition of a data structure may be implied from the description and/or from its name and use in the pseudo-code.

DETAILED METHODS

Following are detailed methods for implementing specific embodiments of the disclosure:
The Acquire-Pointer Method of Stroke Acquisition Module 342:

In accordance with an embodiment, the acquire-pointer method operates as a state machine to create a recording and send it to the evaluation module. In its initial state, it has an empty recording.

Figure 4A:
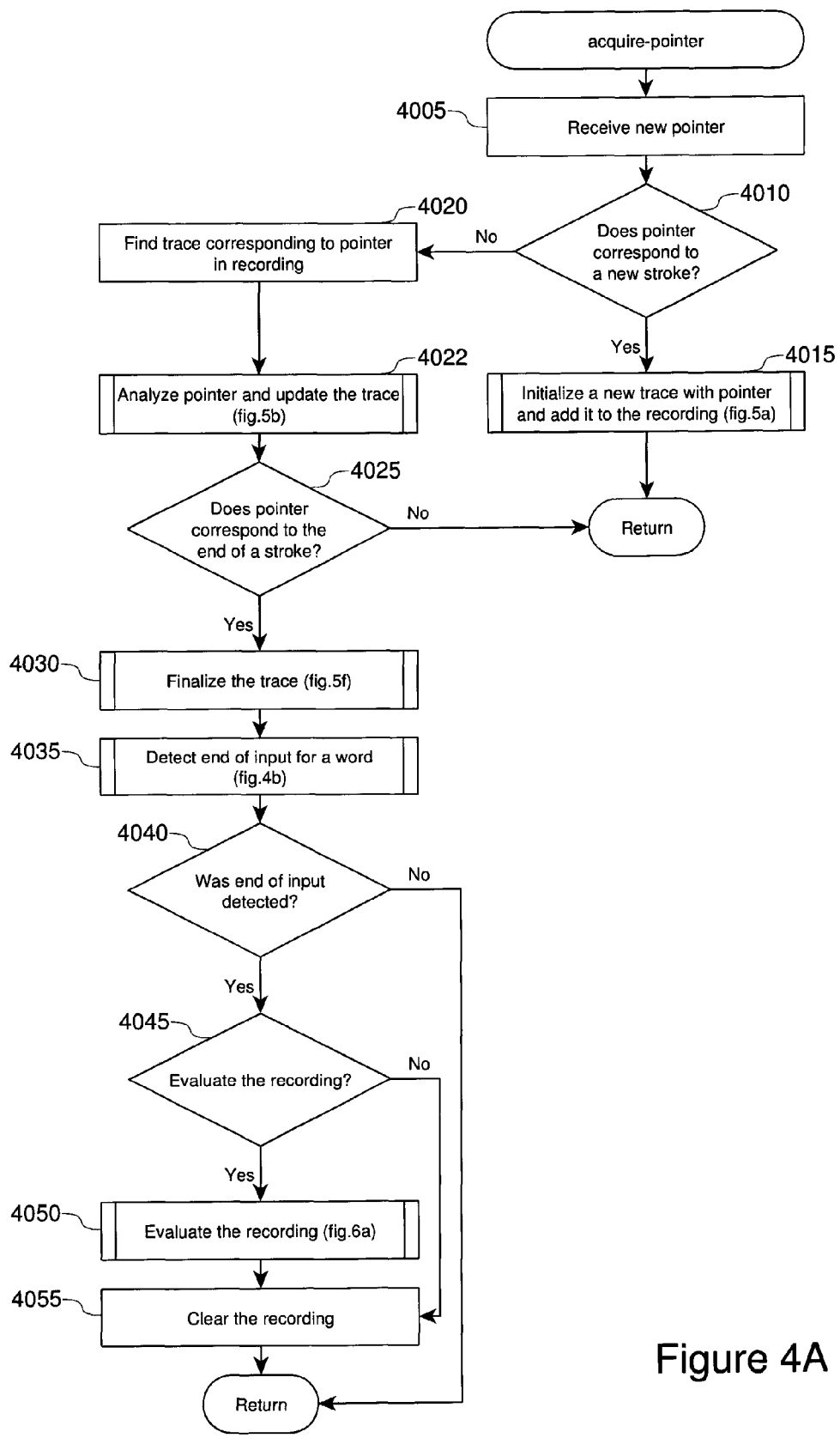
FIG. 4A is a flow diagram of a method of creating a recording, according to an exemplary embodiment of the disclosure.

FIG. 4A is a flowchart of the acquire-pointer method, in accordance with an embodiment of the disclosed subject matter.

In accordance with an embodiment at block 4005, the method receives a new pointer representing the location of a particular stroke at a particular time.

In accordance with an embodiment at block 4010, the method tests if the pointer corresponds to the start of a new stroke; if not, the method proceeds to block 4020.

In accordance with an embodiment of the disclosed subject matter, the method may detect if a pointer corresponds to a new stroke if its pointer action value corresponds to the start of a new stroke, for example pointer-down, or alternatively, if its id does not correspond to an existing trace in the recording.

In accordance with an embodiment, at block 4015, the method calls the initialize-trace method (FIG. 5A) of the stroke processing module 345 to initialize a new trace data structure 3401 to represent the stroke; then adds the trace to the recording, and finally returns control to the caller.

In accordance with an embodiment, as the method initializes and adds trace data structures 3401 to the recording, it makes sure their start times are strictly increasing; an embodiment of the disclosed subject matter may do that by adding a small value to the start time of a new trace if it has the same start time as a previous trace in the recording.

In accordance with an embodiment, at block 4020, the method finds the trace corresponding to the pointer in the recording, by the stroke id of the pointer.

In accordance with an embodiment, at block 4022, the method calls the analyze-pointer method (FIG. 5B) of the stroke processing module to analyze the new pointer and update the trace data structure.

In accordance with an embodiment, at block 4025, the method tests if the pointer action corresponds to the end of a stroke; if not, the method returns control to the caller.

In accordance with an embodiment, at block 4030, the method calls the finalize-trace method (FIG. 5F) of the stroke processing module 345 to finalize the trace.

In accordance with an embodiment, at block 4035, the method calls the detect-end-of-input method (FIG. 4B) to detect if the user finished inputting all strokes for a word.

In accordance with an embodiment, the detect-end-of-input method (FIG. 4B) returns a value indicating if end of input was detected, and if the recording should be evaluated. The method tests the returned value at blocks 4040 and 4045.

In accordance with an embodiment at block 4040, the method tests if end of input was detected; if not, the method returns control to the caller.

In accordance with an embodiment at block 4045, the method tests if the recording should be evaluated; if not, the method proceeds to block 4055.

In accordance with an embodiment at block 4050, the method calls the evaluate-recording method (FIG. 6A) of the evaluation module to find and output database words matching the recording.

In accordance with an embodiment at block 4055, the method clears the recording, so it may acquire strokes for a new word; and finally the method returns control to the caller.

The following pseudo code describes the logic of a possible embodiment of the method.

TABLE 1

```
acquire-pointer(pointer p):
  1. if p.action is POINTER_DOWN:
  2.      trace t = new trace
  3.      id-map[p.id] = length(recording)
  4.      recording.append(t)
  5.      stroke-processing-module.initialize-trace(t, p)
  6.      return
  7.
  8. int index = id-map[p.id]
  9. trace t = recording[index]
 10. stroke-processing-module.analyze-pointer(t, p)
 11.
 12. if p.action is POINTER_UP:
 13.      stroke-processing-module.finalize-trace(t)
 14.      int detect = detect-end-of-input(recording, t)
 15.      if detect is CONTINUE: return
 16.      if detect is EVALUATE:
 17.           evaluation-module.evaluate-recording(recording)
 18.      clear(recording)
 19.      clear(id-map)
```

The Detect-End-of-Input Method of the Stroke Acquisition Module 342:

The detect-end-of-input method detects if the user finished inputting all strokes for a word and if the strokes should be evaluated, in accordance with an embodiment of the disclosed subject matter.

In accordance with an embodiment of the disclosed subject matter, the method detects end of input for a word if the user keystrokes a keyboard key corresponding to a delimiter; the method includes additional tests to detect end of input for a word automatically.

Figure 4B:
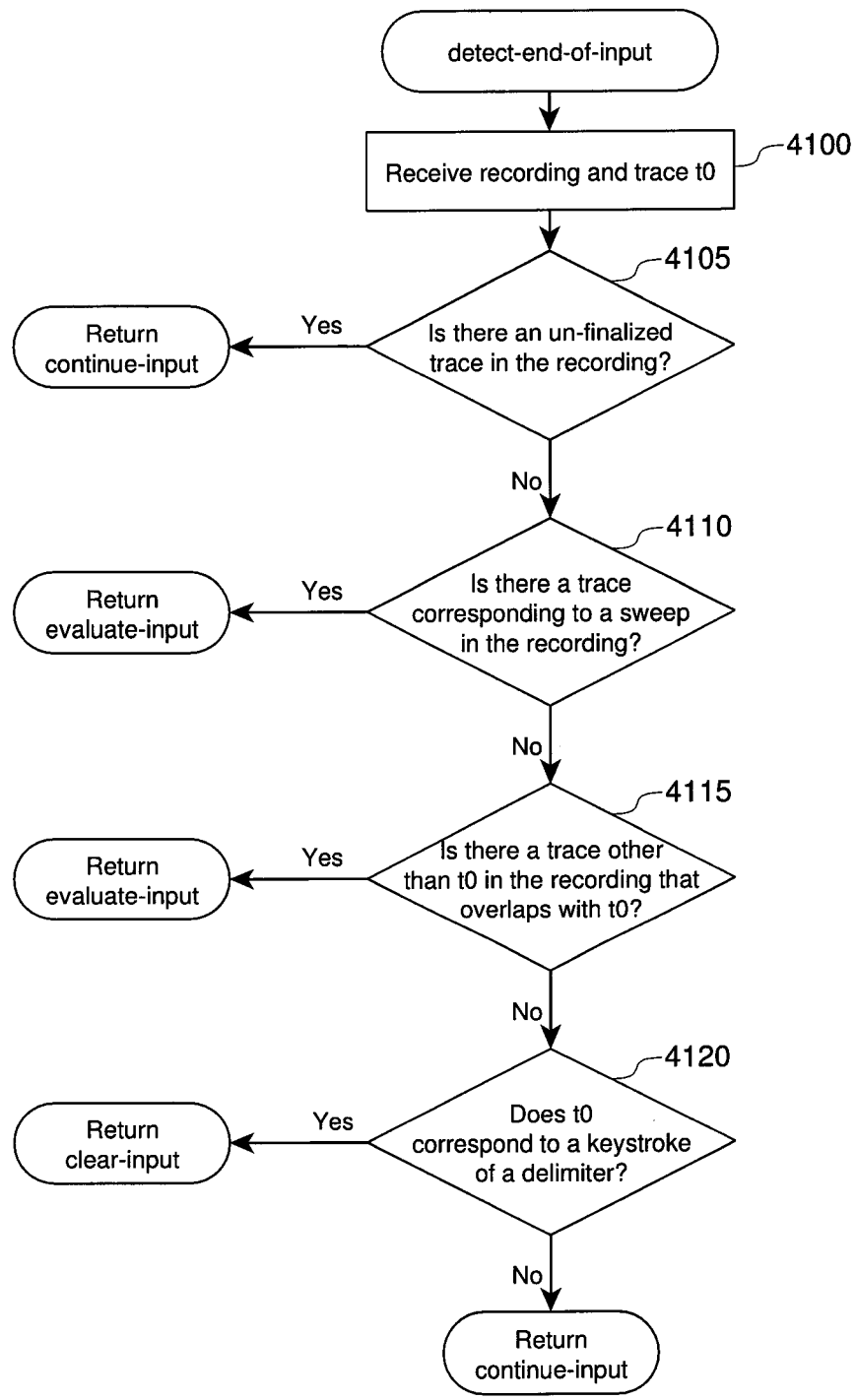
FIG. 4B is a flow diagram of a method of detecting the end of input for a word, according to an exemplary embodiment of the disclosure.

FIG. 4B is a flowchart of the detect-end-of-input method, in accordance with an embodiment of the disclosed subject matter.

In accordance with an embodiment at block 4100, the method receives a recording and the trace t0 corresponding to the last acquired pointer.

In accordance with an embodiment if the recording contains traces that the acquire-method did not yet finalize, it means the user is still inputting at least one stroke.

In accordance with an embodiment at block 4105, the method tests if there exists an un-finalized trace in the recording; if so, the method returns control with a value indicating end of input was not detected.

In accordance with an embodiment, if the user inputs a sweep, the system detects end of input for a word when the user ends all contact with the multi-touch screen; this criteria enables the user to input multiple temporally overlapping sweeps in sequence. Consequently, since at this point the method has already established that all traces were finalized, if it finds a trace corresponding to a sweep, it concludes that the user finished inputting all strokes for a word.

An embodiment of the disclosed subject matter may be configured to disable this test depending on user preference settings stored in memory.

In accordance with an embodiment, a finalized trace corresponds to a sweep if it has two or more trace keys (as will be described below).

In accordance with an embodiment, at block 4110, the method tests if there exists a trace in the recording that corresponds to a sweep; if so, the method returns control with a value indicating end of input was detected and the recording should be evaluated.

In accordance with an embodiment of the disclosed subject matter, the system enables the user to input a word with keystrokes.

In accordance with an embodiment of the disclosed subject matter, the method may enable the user to signal the end of a keystroked word by keystroking the last letter of the word with a defined temporal overlap with a previous keystroke, for example by detaching the two keystroking fingers together off the touch screen.

In accordance with an embodiment, the method determines a keystroke t overlap with the latest keystroke t0 enough to detect end of input, if (t.end−t0.start)>(t0.end−t0.start)*0.67, but a different function may be used.

This mode relieves the user from having to keystroke explicitly a delimiter such as the space key. In addition, it provides for some words, a similar user experience to inputting a word with two sweeps.

For example, the user may input the two letter word 'is', by keystroking the keyboard key corresponding to the letter 'i' with the right hand thumb, and the keyboard key corresponding to the letter 's' with the left hand thumb, and detach the two thumbs simultaneously to signal end of word.

An embodiment of the disclosed subject matter may be configured to disable this test depending on user preference settings stored in memory.

In accordance with an embodiment at block 4115, the method tests if there exists a trace in the recording, other than t0 that overlaps temporally with t0 a defined amount of time; if so, the method returns control with a value indicating end of input was detected and the recording should be evaluated.

In accordance with an embodiment, if the user keystrokes a delimiter, the method will return a value indicating end of input was detected but evaluation should not be done; this mode may be used by the user to input words unknown to the system.

In accordance with an embodiment at block 4120, the method tests if t0 corresponds to a keystroke of a delimiter key. If so, the method returns control with a value indicating end of input was detected but the recording should not be evaluated, otherwise it returns control with a value indicating end of input was not detected.

In accordance with an embodiment of the disclosed subject matter, the method may detect end of input by way of any other appropriate process; for example, the system may allow a user to input multiple sweeps in sequence without temporally overlapping them, by not including automatic detection and by evaluating the recording when a delimiter is keystroked; or for example, the system may be configured to disable specific end-of-input tests by user preference settings stored in memory, or use other tests not described here.

The following pseudo code describes the logic of a possible embodiment of the method.

TABLE 2

```
detect-end-of-input(trace[ ] recording, trace t 0 ):
  1. for trace t in recording:
  2.     if not t.finalized: return CONTINUE
  3.
  4. for trace t in recording:
  5.     if length(t.keys) > 1: return EVALUATE
  6.
  7. for trace t in recording:
  8.     if t is not t0 and (t.end − t0 .start) > (t0 .end − t0 .start) * 0.67:
  9.         return EVALUATE
 10.
 11. if is-delimiter-key(first-element-in(t0 .keys)):
 12.     recording.remove(t0 )
 13.     return CLEAR
 14.
 15. return CONTINUE
```

The Initialize-Trace Method of the Stroke Processing Module 345:

The initialize-trace method initializes a new trace data to represent an input stroke in accordance with an embodiment.

Figure 5A:
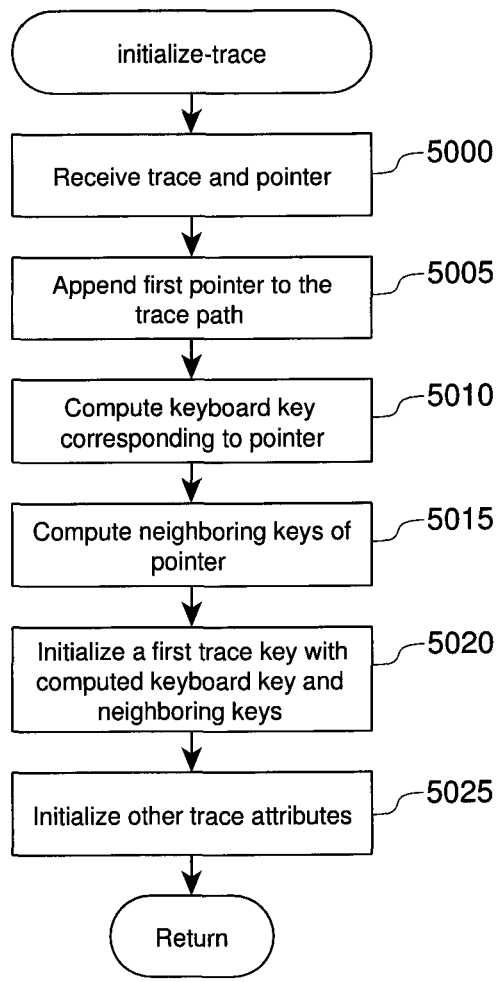
FIG. 5A is a flow diagram of a method of initiating a trace data structure, according to an exemplary embodiment of the disclosure.

FIG. 5A is a flowchart of the initialize-trace method in accordance with an embodiment of the disclosed subject matter.

In accordance with an embodiment at block 5000, the method receives the trace to initialize and a first pointer corresponding to the trace.

In accordance with an embodiment at block 5005, the method appends the first pointer to the empty trace path.

In accordance with an embodiment at block 5010, the method computes the keyboard key corresponding to the pointer.

In accordance with an embodiment at block 5015, the method computes the neighboring keys of the pointer.

In accordance with an embodiment, a keyboard key k is a neighboring key of a pointer p, if p falls within the area of an ellipse having major and minor radii twice the keyboard key width and height, respectively, and centered at the center point of k. Additionally or alternatively, it can be computed if a keyboard key is a neighboring key of a pointer p by way of any appropriate process; for example, the system may use the area of a rectangle instead of an ellipse, or transform the area of the ellipse to correspond to a velocity vector computed for the pointer.

In accordance with an embodiment at block 5020, the method creates a new trace key data structure and initializes it with the keyboard key, the neighboring keys, flags it as a landmark key, sets its path index to the first pointer in the trace path, and appends it to the list of trace keys.

In accordance with an embodiment, a trace includes a temporary trace key (as will be described below), to represent the next trace key not yet appended to the trace keys.

In accordance with an embodiment at block 5025, the method sets the trace start time to the timestamp of the first pointer, and creates the temporary trace key; then it returns control to the caller of the method.

The following pseudo code describes the logic of a possible embodiment of the method.

TABLE 3

```
initialize-trace(trace t, pointer p):
  1. trace-key tk = new trace-key
  2. tk.key = key-from-pointer(p)
  3. tk.neighbors = neighbors-from-pointer(p)
  4. tk.landmark = true
  5. tk.path-index = 0
  6. t.keys.append(tk)
```

TABLE 3-continued

```
7. t.path.append(p)
8. t.start = p.timestamp
9. t.tmp = new trace-key
10. t.finalized = false
```

The Analyze-Pointer Method of the Stroke Processing Module 345:

In accordance with an embodiment the analyze-pointer method progressively adds information to a trace with each input pointer.

Figure 5B:
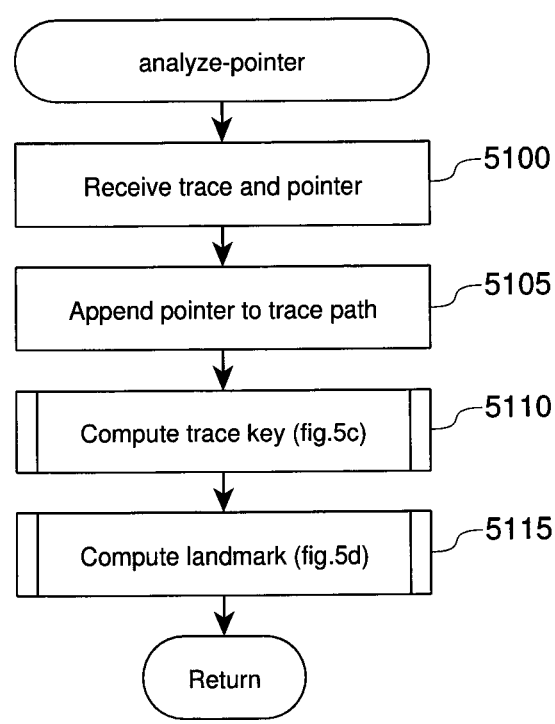
FIG. 5B is a flow diagram of a method of adding a pointer to a trace data structure, according to an exemplary embodiment of the disclosure.

FIG. 5B is a flowchart of the analyze-pointer method in accordance with an embodiment of the disclosed subject matter.

In accordance with an embodiment at block 5100, the method receives the last acquired pointer and the corresponding trace.

In accordance with an embodiment at block 5105, the method appends the pointer to the trace path.

In accordance with an embodiment at block 5110, the method calls the compute-trace-key method (FIG. 5C) of the stroke processing module to compute the next trace key.

In accordance with an embodiment at block 5115, the method calls the compute-landmark method (FIG. 5D) of the stroke processing module to compute the next landmark key; then it returns control to the caller of the method.

The following pseudo-code describes the logic of a possible embodiment of the method.

TABLE 4

```
analyze-pointer(trace t, pointer p):
1. t.path.append(p)
2. compute-trace-key(t)
3. compute-landmark(t)
```

The Compute-Trace-Key Method of the Stroke Processing Module 345:

The compute-trace-key method progressively computes the sequence of trace keys corresponding to keyboard keys traversed by a stroke in accordance with an embodiment.

One possible approach of an embodiment of the method, would include determining the keyboard key activated by a new pointer and creating a new trace key if the last trace key corresponds to a different keyboard key. However, such an approach may fail to handle correctly several cases. One case is stroke jitters that result in consecutive pointers jumping back and forth between keyboard keys during a stroke. Additionally, it may compute staircases of keyboard keys for diagonal strokes, and finally it may skip keyboard keys in case a "hiccup" in the system results in a pointer that is several keyboard keys away from the preceding pointer.

Figure 7A:
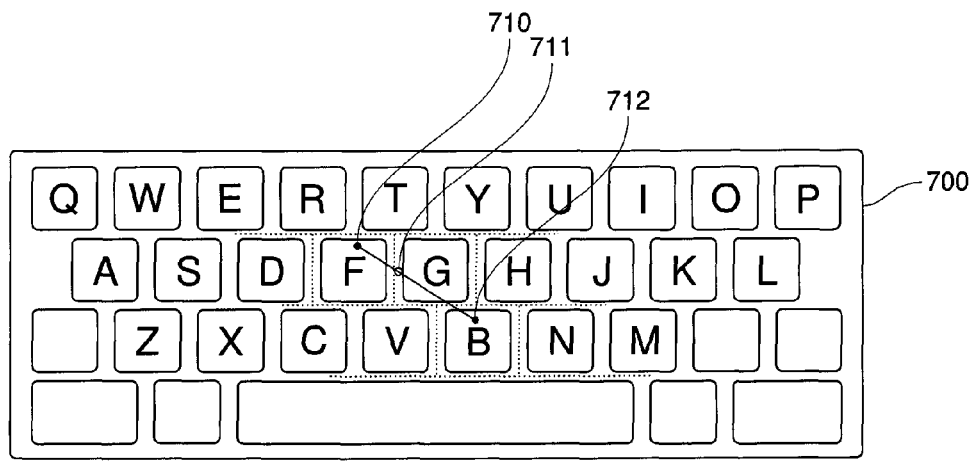
FIG. 7A is a schematic illustration of a trace path relating to a method of computing a trace key from a pointer, according to an exemplary embodiment of the disclosure.

To handle the case where a pointer p1 "jumps" several keyboard keys away from the preceding pointer p0, an embodiment of the method interpolates an intermediate pointer p that is nearest to p0 but in the activation area of a different keyboard key. FIG. 7A shows a pointer p0 710 in the activation area of the keyboard key corresponding to the letter 'F', and a pointer p1 712 in the activation area of the keyboard key corresponding to the letter 'B', several keyboard keys apart. This embodiment of the method interpolates an intermediate pointer p 711 between p0 and p1 at the nearest location to p0 that is in the activation area of a different keyboard key, in this case the keyboard key corresponding to the letter 'G'.

Figure 7B:
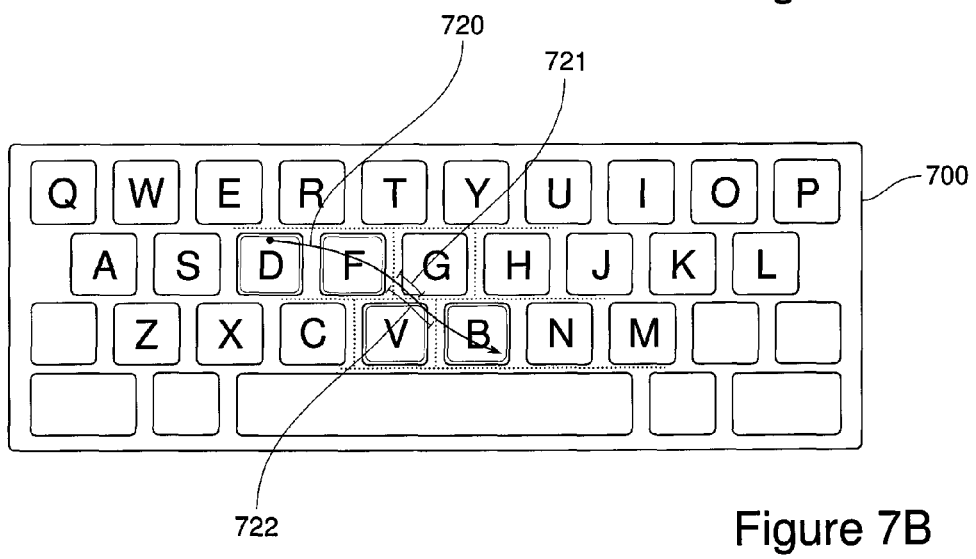
FIG. 7B is a schematic illustration of a trace path relating to a method of computing trace keys from a stroke, according to an exemplary embodiment of the disclosure.

To handle the staircase and uttering stroke problem, an embodiment of the method computes the distance traversed by the stroke since first leaving the activation area of the keyboard key corresponding to the last trace key. This embodiment of the method will only create a new trace key once the distance traversed meets a minimum threshold. FIG. 7B illustrates a stroke 720 traversing through the activation area of several keyboard keys. This embodiment of the method does not generate a trace key for the keyboard key corresponding to the letter 'G' since the distance traversed 721 does not meet the minimum threshold, whereas it generates a trace key for the keyboard key corresponding to the letter 'V' since the distance traversed 722 does meet the minimum threshold.

In accordance with an embodiment of the disclosed subject matter, the method uses a temporary trace key to keep track of the next trace key until it meets the minimum distance threshold and added as a new trace key.

Figure 5C:
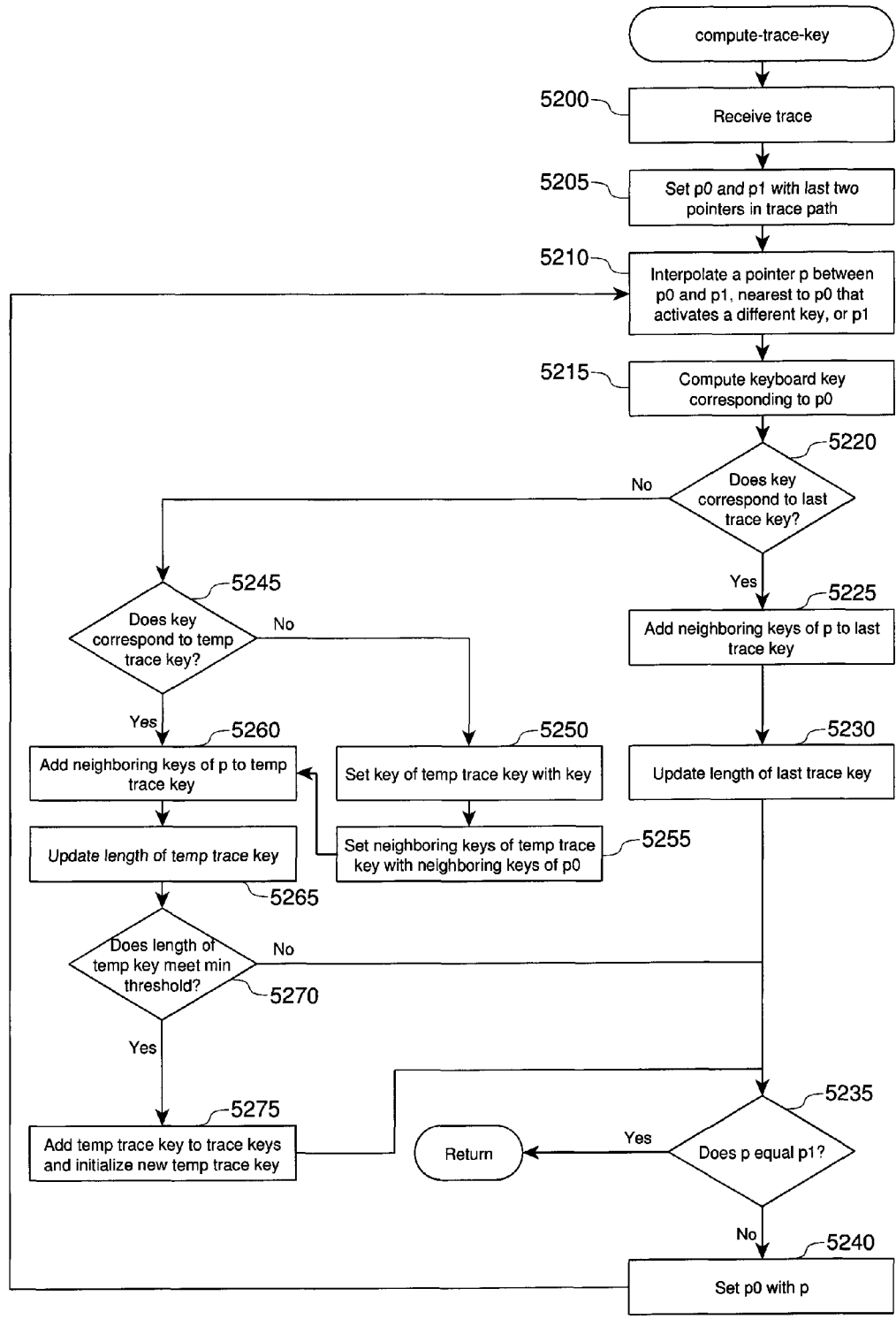
FIG. 5C is a flow diagram of a method of identifying keys traversed by a stroke, according to an exemplary embodiment of the disclosure.

FIG. 5C is a flowchart of the compute-trace-key method in accordance with an embodiment of the disclosed subject matter.

In accordance with an embodiment at block 5200, the method receives a trace to compute.

In accordance with an embodiment at block 5205, the method looks up the two last pointers in the trace path as p0 and p1.

In accordance with an embodiment at block 5210, the method interpolates an intermediate pointer p between p0 and p1 that is nearest to p0 but is in the activation area of a different keyboard key; if no such pointer exists then it assigns p with the value of p1. The process of interpolating the pointer p can be implemented using any appropriate interpolation technique.

In accordance with an embodiment at block 5215, the method computes the keyboard key k0 corresponding to p0. The keyboard key k0 may or may not be different from the keyboard key of the last trace key.

In accordance with an embodiment at block 5220, the method tests if the keyboard key k0 corresponds to the last trace key; if not, the method proceeds to block 5245.

In accordance with an embodiment for each trace key, the method computes its neighboring keys as the union of the neighboring keys of the pointers falling inside the activation area of the corresponding keyboard key, and the pointers interpolated on the border of the activation area.

In accordance with an embodiment at block 5225, the method computes the neighboring keys of p and adds them to the set of neighboring keys of the last trace key.

In accordance with an embodiment, the method may keep track of the length of the stroke segment corresponding to a trace key, for example, for statistics, or debugging.

In accordance with an embodiment at block 5230, the method computes the distance between p0 and p and adds it to the length of the last trace key.

In accordance with an embodiment in the final interpolation iteration, which may be the first or a subsequent iteration, for example if both p0 and p1 fall within the activation area of the same keyboard key, the interpolated pointer p equals p1.

In accordance with an embodiment at block 5235, the method tests if the pointer p equals p1; if so, the method returns control to the caller of the method.

In accordance with an embodiment at block 5240, the method sets p0 with the value of p and returns to block 5210 for a new interpolation cycle.

The keyboard key k0 may be different than the keyboard key of the temporary trace key if the stroke continues to a new keyboard key before meeting the minimum length threshold.

In accordance with an embodiment at block 5245, the method tests if the keyboard key k0 corresponds to the temporary trace key; if so, the method proceeds to block 5260.

In accordance with an embodiment at block 5250, the method sets the keyboard key of the temporary trace key to the keyboard key k0.

In accordance with an embodiment at block 5255, the method sets the neighboring keys of the temporary trace key to the neighboring keys of p0.

In accordance with an embodiment at block 5260, the method computes the neighboring keys of p and adds them to the set of neighboring keys of the temporary trace key.

In accordance with an embodiment at block 5265, the method computes the distance between p0 and p and adds it to the length of the temporary trace key.

In accordance with an embodiment, the method uses a minimum length threshold of 30% of a keyboard key width, but any other threshold may be used.

In accordance with an embodiment at block 5270, the method tests if the length of the temporary trace key meets the minimum length threshold; if not, the method proceeds to block 5235 for a new iteration.

In accordance with an embodiment at block 5275, the method sets the path index of the temporary trace key to the last pointer in the trace path, adds the temporary trace key to the list of trace keys as a new trace key, and initializes a new temporary trace key; then, the method proceeds to block 5235 for a new iteration.

The following pseudo code describes the logic of a possible embodiment of the method.

TABLE 5

```
compute-trace-key(trace t):
 1. pointer p0 = t.path[length(t.path)-2]
 2. pointer p1 = t.path[length(t.path)-1]
 3.
 4. do:
 5.      pointer p = interpolate-at-key-boundary(p0 , p1 )
 6.      key k0 = key-from-pointer(p0 )
 7.
 8.      if k0 equal last-element-in(t.keys).key:
 9.           last-element-in(t.keys).neighbors +=
               neighbors-from-pointer(p)
10.              last-element-in(t.keys).length += distance(p0 , p)
11.           if p1 equal p: return 17
12.           p0 = p
13.           continue
14.
15.      if k0 not equal t.tmp.key:
16.           t.tmp.key = k0
17.           t.tmp.neighbors = neighbors-from-pointer(p0 )
18.
19.      t.tmp.neighhors += neighbors-from-pointer(p)
20.      t.tmp.length += distance(p0 , p)
21.
22.      if t.tmp.length >= KEY_WIDTH * 0.3:
23.           t.tmp.path-index = length(t.path) - 1
24.           t.keys.append(t.tmp)
25.           t.tmp = new trace-key
26.
27.      if p1 equal p: return
28.      p0 = p
```

The Compute-Landmark Method of the Stroke Processing Module 345:

In accordance with an embodiment, the compute-landmark method detects pointers corresponding to significant changes in the direction of the stroke path, and is designed to be insensitive to typical jitters and inaccuracies in the sequence of pointers generated from touch sensitive screens systems in response to contact.

Figure 7C:
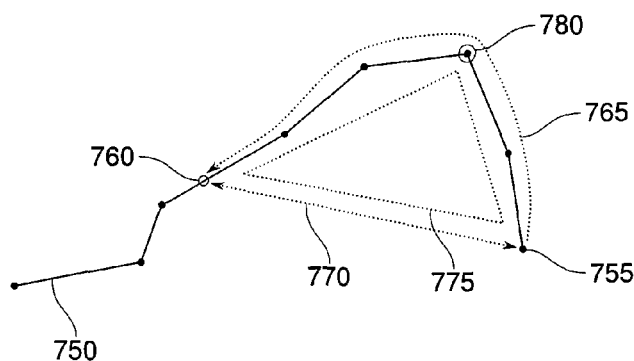
FIG. 7C is a schematic illustration of a trace path with significant changes in direction, according to an exemplary embodiment of the disclosure.

FIG. 7C illustrates how the method operates in accordance with an embodiment of the disclosed subject matter; the method walks a defined Euclidean distance 765 back the trace path 750, from the latest pointer p0 755, to a pointer px 760 interpolated between two trace path pointers; then it computes the ratio between the walk distance 765 and the direct Euclidean distance 770 between p0 and px. A ratio of 1:1 corresponds to a straight line, while a small ratio corresponds to an inflection in the path. If the ratio falls below a defined threshold, the method locates the landmark pointer as the pointer p1 780 between p0 and px, which maximizes the perimeter of the triangle 775 defined by the three pointers.

In accordance with an embodiment of the disclosed subject matter, the method uses a walk distance of 85% the height of a keyboard key, and a threshold ratio of 1/sqrt(2). The threshold ratio of 1/sqrt(2) is used since it is the ratio between the hypotenuse and the sum of the other two sides in a right angle triangle, and is therefore the ratio corresponding to a perfect right angle change of direction in the stroke path. However, a different embodiment of the disclosed subject matter may use a different ratio and/or walk distance.

Figure 5D:
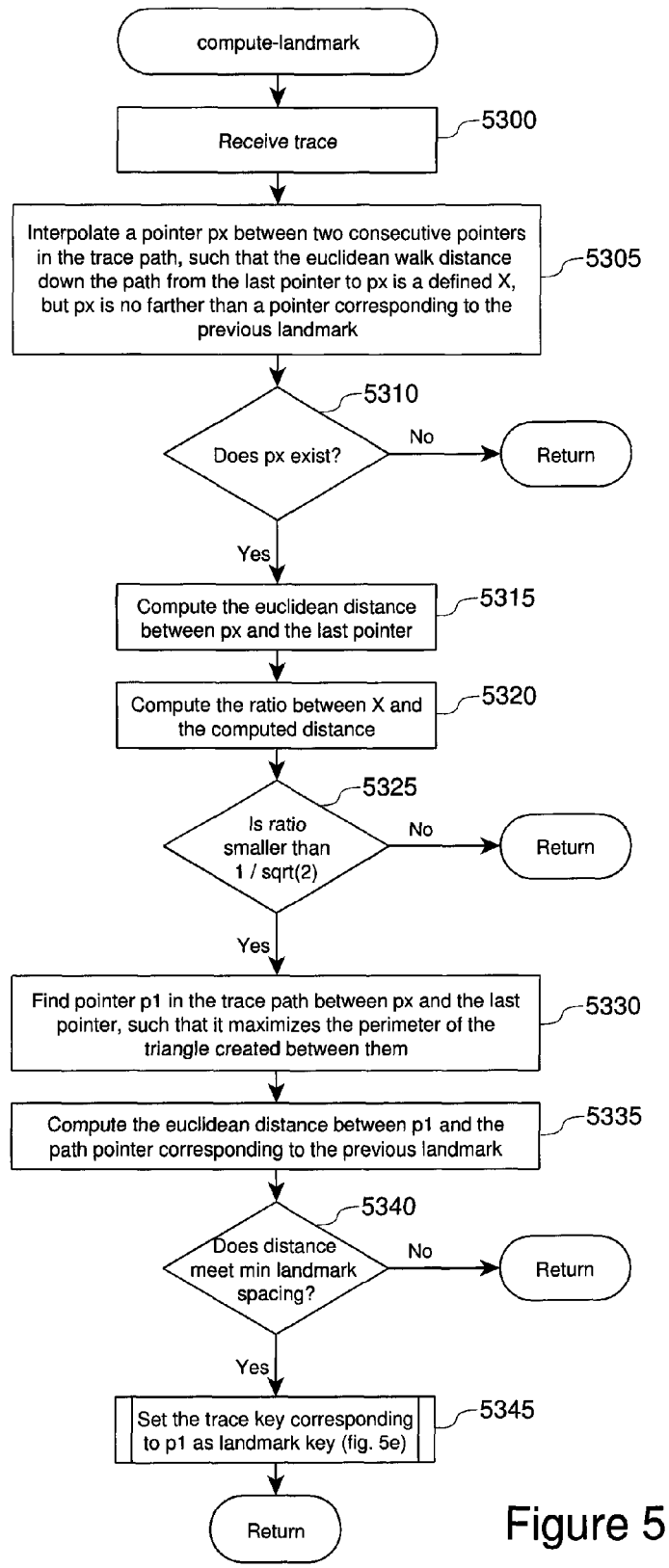
FIG. 5D is a flow diagram of a method of detecting landmark pointers, according to an exemplary embodiment of the disclosure.

FIG. 5D is a flowchart of the compute-landmark method, in accordance with an embodiment of the disclosed subject matter.

In accordance with an embodiment at block 5300, the method receives a trace to compute.

In accordance with an embodiment at block 5305, the method "walks" a defined Euclidean distance down the recorded trace path to a pointer px that it interpolates between two consecutive trace path pointers; however, the method will not walk beyond a previous landmark pointer.

In accordance with an embodiment at block 5310, the method tests if the entire distance was walked successfully; if not, the method returns control to the caller of the method.

In accordance with an embodiment at block 5315, the method computes the Euclidean distance between the two endpoints of the walked path segment.

In accordance with an embodiment at block 5320, the method computes the ratio between the defined walk distance, and the Euclidean distance between the two endpoints of the walked segment.

In accordance with an embodiment at block 5325, the method tests if the computed ratio is smaller than 1/sqrt(2); if not, the method returns control to the caller of the method.

In accordance with an embodiment at block 5330, the method finds, in the walked path segment, the trace path pointer that maximizes the perimeter of the triangle defined by the pointer and the two endpoints of the walked segment.

In accordance with an embodiment the computed pointer is designated the landmark pointer.

In accordance with an embodiment at block 5335, the method computes the Euclidean distance between the new landmark pointer and the previous landmark pointer.

In accordance with an embodiment at block 5340, the method tests if the computed distance meets a minimum spacing threshold; if not, the method discards the new landmark pointer to keep minimal landmark spacing, and returns control to the caller of the method.

In accordance with an embodiment, the method uses a landmark spacing threshold of one keyboard key height, but any other threshold may be used.

In accordance with an embodiment at block 5345, the method calls the set-landmark-key method of the stroke processing module to find the corresponding trace key and mark it as a landmark key.

An embodiment of the disclosed subject matter may use any other appropriate technique to locate trace path pointers corresponding to significant changes in the direction of the trace path.

The following pseudo code describes the logic of a possible embodiment of the method.

TABLE 6

```
compute-landmark(trace t):
  1. pointer p0 = last-element-in(t.path)
  2. float segment-length = 0
  3. float d = 0
  4. int prev-landmark = previous-landmark-index(t) 19
  5. int i = length(t.path) − 2
  6.
  7. while i > prev-landmark:
  8.     pointer p1 = t.path[i]
  9.     d = distance(p0 , p1 )
 10.     if segment-length + d >= WALK_DISTANCE:
 11.         break
 12.     segment-length += d
 13.     p0 = p1
 14.     i−−
 15.
 16. if segment-length + d < WALK_DISTANCE:
 17.     return
 18.
 19. float ratio = (WALK_DISTANCE − segment-length) / d
 20. pointer px = linear-combination(p0 , p1 , ratio)
 21. pointer p0 = last-element-in(t.path)
 22.
 23. if distance(p0 , px ) > WALK_DISTANCE / sqrt(2):
 24.     return
 25.
 26. int new-landmark = 0
 27. float max-legs = 0
 28.
 29. while i < length(t.path) − 2:
 30.     i++
 31.     float legs = distance(p0 , t.path[i]) + distance(p x ,
         t.path[i])
 32.     if max-legs < legs:
 33.         max-legs = legs
 34.         new-landmark = i
 35.
 36. pointer p0 = t.path[prev-landmark]
 37. pointer p1 = t.path[new-landmark]
 38. if distance(p0 , p1 ) < KEY_HEIGHT:
 39.     return
 40.
 41. set-landmark-key(t, new-landmark)
```

The Set-Landmark-Key Method of the Stroke Processing Module 345:

In accordance with an embodiment, the method finds the trace key corresponding to a landmark pointer and marks it as a landmark key. The landmark pointer may correspond to one of the existing trace keys or to the temporary trace key. If the pointer corresponds to the temporary trace key, the method adds the temporary trace key to the list of trace keys.

Figure 5E:
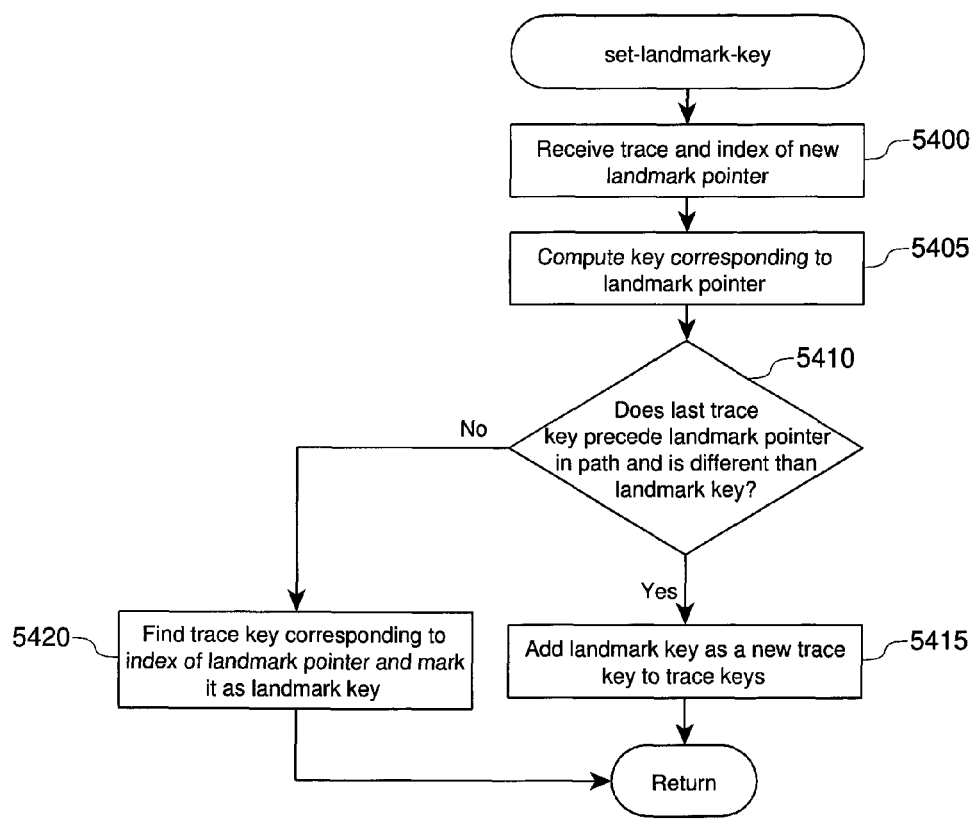
FIG. 5E is a flow diagram of a method of identifying landmark keys from a landmark pointer, according to an exemplary embodiment of the disclosure.

FIG. 5E is a flowchart of the set-landmark-key method in accordance with an embodiment of the disclosed subject matter.

In accordance with an embodiment at block 5400, the method receives a trace to compute and the index of the landmark pointer in the trace path.

In accordance with an embodiment at block 5405, the method computes the keyboard key k0, corresponding to the landmark pointer.

In accordance with an embodiment at block 5410, the method tests if k0 is different from the keyboard key of the last trace key, and if the path index of the last trace key precedes the index of the landmark pointer; if not, the method proceeds to block 5420.

In accordance with an embodiment if the landmark pointer comes after the path index of the last trace key and corresponds to a different keyboard key it means that it corresponds to a keyboard key that has not yet met the minimum length threshold required for a new trace key.

In accordance with an embodiment at block 5415, the method initializes a new trace key as a landmark key from the landmark pointer, adds it to the trace keys, and then returns control to the caller of the method.

In accordance with an embodiment at block 5420, the method iterates backwards the list of trace keys until it finds the trace key corresponding to the landmark pointer and marks it as a landmark key.

The following pseudo code describes the logic of a possible embodiment of the method.

TABLE 7

```
set-landmark-key(trace t, int landmark-index):
  1. key landmark-key = key-from-pointer(t.path[landmark-index])
  2.
  3. if last-element-in(t.keys).path-index <= landmark-index and
  4.     last-element-in(t.keys).key not equal landmark-key:
  5.     t.tmp.key = landmark-key
  6.     t.tmp.landmark = true
  7.     t.tmp.path-index = landmark-index
  8.     t.keys.append(t.tmp)
  9.     t.tmp = new trace-key
 10.     return
 11.
 12. int i = length(t.keys) − 1
 13. while t.keys[i].path-index > landmark-index:
 14.     i−−
 15.
 16. if t.keys[i].key not equal landmark-key:
 17.     i++
 18.
 19. t.keys[i].landmark = true
 20. t.keys[i].path-index = landmark-index
```

Figure 5F:
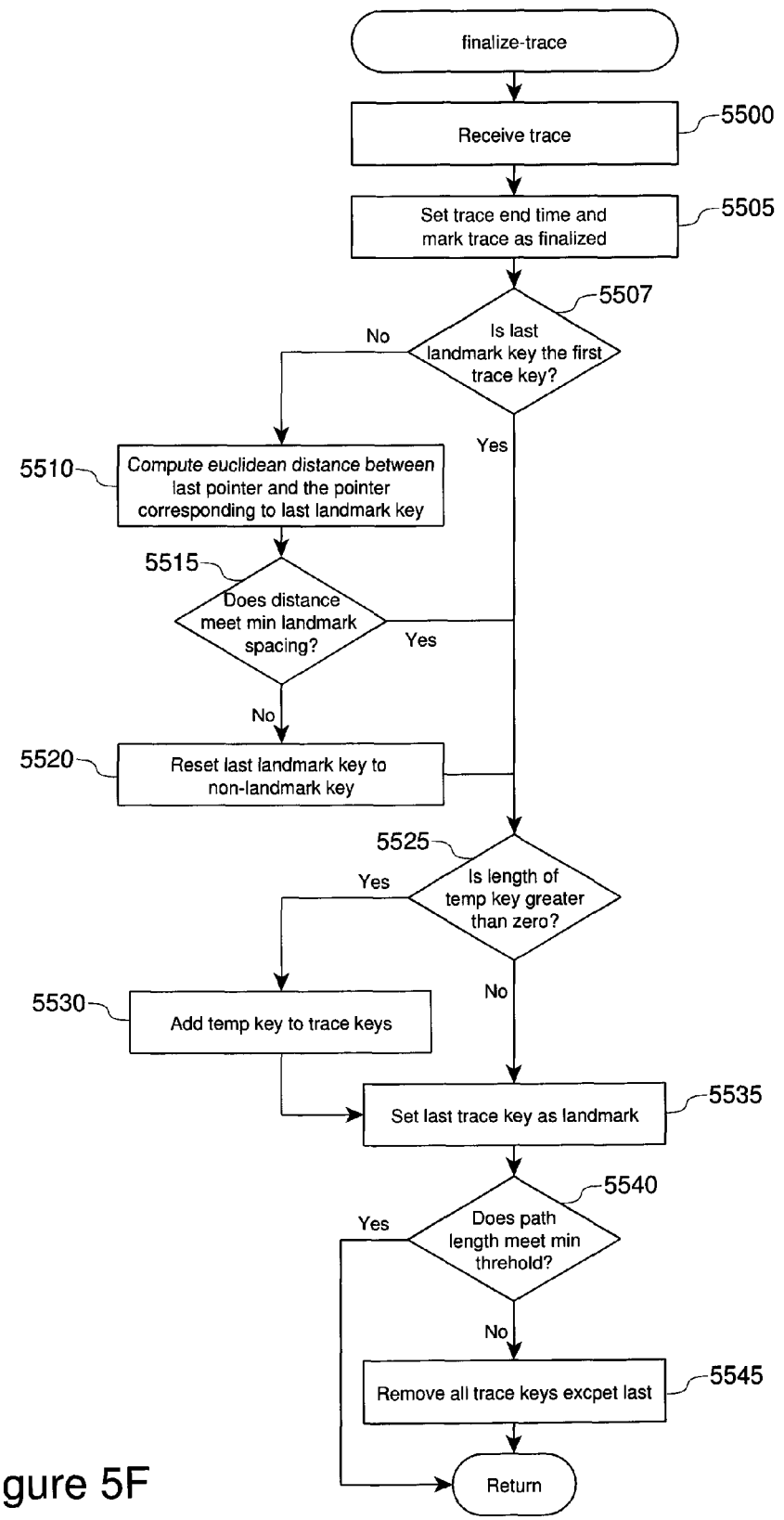
FIG. 5F is a flow diagram of a method of finalizing a trace, according to an exemplary embodiment of the disclosure.

The Finalize-Trace Method of the Stroke Processing Module 345:

FIG. 5F is a flowchart of the finalize-trace method of the stroke processing module 345 in accordance with an embodiment of the disclosed subject matter.

In accordance with an embodiment at block 5500, the method receives the trace to finalize.

In accordance with an embodiment at block 5505, the method sets the end time of the trace to the timestamp of the last pointer in the trace path and marks the trace as finalized.

In accordance with an embodiment the method discards the last landmark if required, to keep minimal landmark spacing from the last pointer of the trace.

In accordance with an embodiment at block 5507, the method finds the last landmark key in the trace keys, and tests if it is the first trace key; if so, the method proceeds to block 5525.

In accordance with an embodiment at block 5510, the method computes the Euclidean distance between the last pointer in the trace path and the pointer corresponding to the last landmark key.

In accordance with an embodiment at block 5515, the method tests if the computed distance meets the minimum landmark spacing threshold; if so, the method proceeds to block 5525.

In accordance with an embodiment at block 5520, the method resets the last landmark key to a non-landmark key, that is, a regular trace key.

In accordance with an embodiment of the disclosed subject matter, if the length of the temporary trace key of a finalized trace is greater than zero it means the corresponding stroke ended in the activation area of a keyboard key before meeting the minimum length threshold for a new trace key.

In accordance with an embodiment at block 5525, the method tests if the length of the temporary trace key of the trace is greater than zero; if not, the method proceeds to block 5535.

In accordance with an embodiment at block 5530, the method adds the temporary trace key as the last trace key.

In accordance with an embodiment at block 5535, the method sets the last trace key as a landmark key.

In accordance with an embodiment when the user keystrokes a keyboard key, the effective result may be a stroke of some actual length; in particular, the first and last pointers of the keystroke may activate different keyboard keys. To distinguish between an intended keystroke and a sweep the method uses a minimum sweep length threshold of half the width of a keyboard key, but a different minimum sweep length threshold may be used instead.

In accordance with an embodiment at block 5540, the method tests if the Euclidean length of the trace path meets the minimum sweep length threshold; if so, the method returns control to the caller of the method.

In accordance with an embodiment at block 5545, the method removes all trace keys except the last trace key, in effect, classifying the stroke as a keystroke.

The following pseudo code describes the logic of a possible embodiment of the method.

TABLE 8

```
finalize-trace(trace t):
 1. t.end = last-element-in(t.path).timestamp
 2. t.finalized = true
 3.
 4. pointer p0 = last-element-in(t.path)
 5. int i = length(t.keys) − 1
 6. while i > 0:
 7.     if t.keys[i].landmark:
 8.         pointer p1 = t.path[t.keys[i].path-index]
 9.         if distance(p0 , p1 ) < KEY_HEIGHT:
10.             t.keys[i].landmark = false
11.             break
12.     i−−
13.
14. if t.tmp.length > 0:
15.     t.keys.append(t.tmp)
16.
17. last-element-in(t.keys).landmark = true
18. last-element-in(t.keys).path-index = length(t.path) − 1
19.
20. if length(t.keys) == 2 and
21.     t.keys[0].length + t.keys[1].length < KEY_WIDTH * 0.5:
22.     remove-first(t.keys)
```

The Evaluate-Recording Method of the Evaluation Module 344:

The evaluate-recording method computes a list of candidate words that match a recording in accordance with an embodiment of the disclosed subject matter.

In accordance with an embodiment the method iterates a database of words that correspond to dictionary words in a given language; for each word in the database, the method computes the normalized word and takes it through a sequence of computations; the sequence comprises fast filtering, matching, and optionally adjusting the match score.

In accordance with an embodiment, the method may use various schemes to store words in the database, for example, sort the database by the frequency of words in the language, include grammatical information with each word, and include the normalized form of the word in the database to reduce computation time, and so on.

It is advantageous if the evaluate-recording method completes quickly; the user may perceive the system as unresponsive if the method takes longer than 200 ms to complete. The performance of the system depends on various factors, for example, the performance of the system hardware components, the technology used by the operating system, and the specific embodiment of the disclosed subject matter.

For example, an embodiment of the disclosed subject matter having a 800 MHz ARMv6 CPU and an ANDROID 2.3 operating system may be able to iterate a 100,000 words dictionary within 50 to 150 ms, by employing specific performance optimizations particular to that system. The combination of the ANDROID operating system with the ARMv6 CPU is notable for extremely slow memory allocation and data structures such as maps, sets and lists; the embodiment may work around these limitations by avoiding memory allocations at performance hotspots, and by using low level table lookups, prepared for each recording prior to iterating the database. An example for such a lookup table is a Boolean array indicating if a character corresponds to a neighboring key of a trace key. However, since performance optimizations that may be specific to certain embodiments of the disclosed subject matter are well known in the art, and may be created using well-known engineering methods, they are not described further in this description.

In accordance with an embodiment, the method may stop iterating the database after a defined time elapsed, to keep the system responsive. If the method iterates the words in the database in descending frequency order, it will still iterate the most frequent words.

Figure 6A:
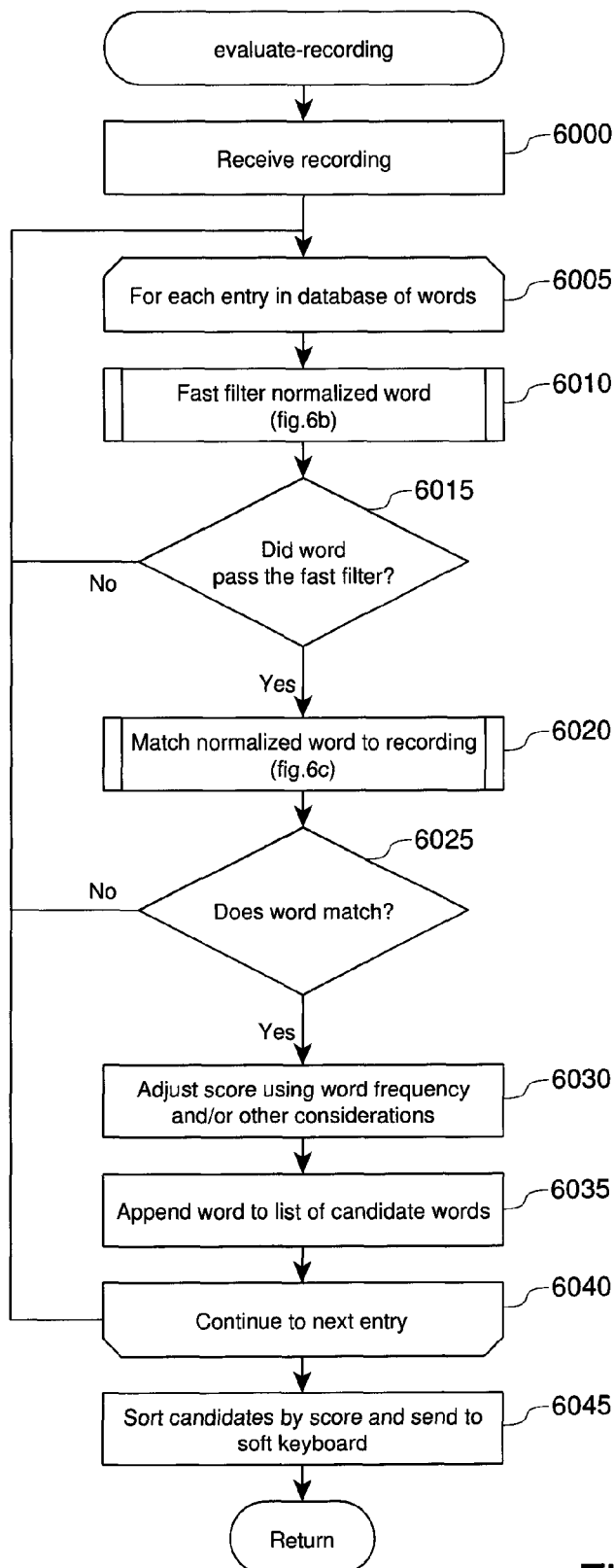
FIG. 6A is a flow diagram of a method of identifying a list of candidate words that match a recording, according to an exemplary embodiment of the disclosure.

FIG. 6A is a flowchart of the evaluate-recording method in accordance with an embodiment.

In accordance with an embodiment at block 6000, the method receives the recording.

In accordance with an embodiment at block 6005, the method iterates each word entry in the database of words.

In accordance with an embodiment, the method calls the fast-filter method (FIG. 6B) to determine quickly if a normalized word can possibly match the recording; the purpose of the fast filter method is to reduce the time to evaluate a recording to an acceptable level, and it may or may not be required in a system that can evaluate the recording quickly without it, for example, future hardware that would perform computations an order of magnitude faster than contemporary hardware may or may not require the fast filter.

In accordance with an embodiment at block 6010, the method calls the fast-filter method to determine quickly if the normalized word can possibly match the recording.

In accordance with an embodiment at block 6015, the method tests if the normalized word passed the fast filter; if not, the method proceeds to a new iteration at block 6005.

In accordance with an embodiment at block 6020, the method calls the match method to determine if, and how well, the normalized word matches the recording.

In accordance with an embodiment at block 6025, the method tests if the normalized word matched the recording; if not, the method proceeds to a new iteration at block 6005.

In accordance with an embodiment at block 6030, the method may adjust the match score of the word, computed by the match method, using various considerations, for example, by word frequency in the language or in text generated previously by the user, by language model, and so on.

In accordance with an embodiment, the system includes a database of 100,000 word forms of the English language sorted by descending frequency; according to Zipf's law, the frequency of each word is reversely proportional to its rank in such a database. The method adjusts the score of each matched word with a scalar computed as 100−log(rank)^3/15, but other functions may be used.

In accordance with embodiment of the disclosed subject matter, the system may use any other appropriate natural language processing technique to adjust the score of a matched word; for example the system may use statistics of bigrams and colocations in text previously input by user; for example, the system may analyze grammar of input text, or adjust the frequency of words in the word database to reflect frequency in text previously input by user, and similar enhancements.

In accordance with an embodiment at block 6035, the method adds the matched word and its score to a list of candidate words.

In accordance with an embodiment at block 6040, the method, proceeds to a new iteration at block 6005 if there are more entries in the database.

In accordance with an embodiment at block 6045, the method sorts the candidate words by their score and sends the sorted list of candidate words to the soft keyboard for output.

The following pseudo code describes the logic of a possible embodiment of the method.

TABLE 9

```
evaluate-recording(trace[ ] traces):
  1. list candidates = new list
  2. int score
  3.
  4. for entry e in descending-frequency-sorted-dictionary:
  5.     if not fast-filter(e.normalized-word, traces):
  6.         continue
  7.
  8.     score = match(e.normalized-word, traces):
  9.     if score == -1:
 10.         continue
 11.
 12.     score += 100 − log(e.rank) ^ 3 / 15
 13.     candidates.append((score, e.word))
 14.
 15. sort-by-descending-score(candidates)
 16. output(candidates)
```

The Fast-Filter Method of the Evaluation Module 344:

In accordance with an embodiment, the fast filter method comprises a sequence of tests designed to determine quickly if a given word can possibly match the recording.

In accordance with an embodiment, the purpose of the fast filter method is to reduce the time to evaluate a recording to an acceptable level; it consists of a sequence of tests that can be performed quickly and combine to eliminate a significant percent of tested words.

In accordance with an embodiment, the individual tests are ordered from the simplest to the most computationally heavy.

An embodiment of the disclosed subject matter may perform additional and/or different tests, in the same or in different order than that described here.

In accordance with an embodiment, it is noted that the described tests may be optimized to use simple table lookups that may be computed quickly.

It is noted that the definitions of the start key, end key, trace cover and landmark cover, are derived from the set of conditions and the definition of the order relation (as will be described below), and that an embodiment of the disclosed subject matter may use and implement different definitions.

Figure 6B:
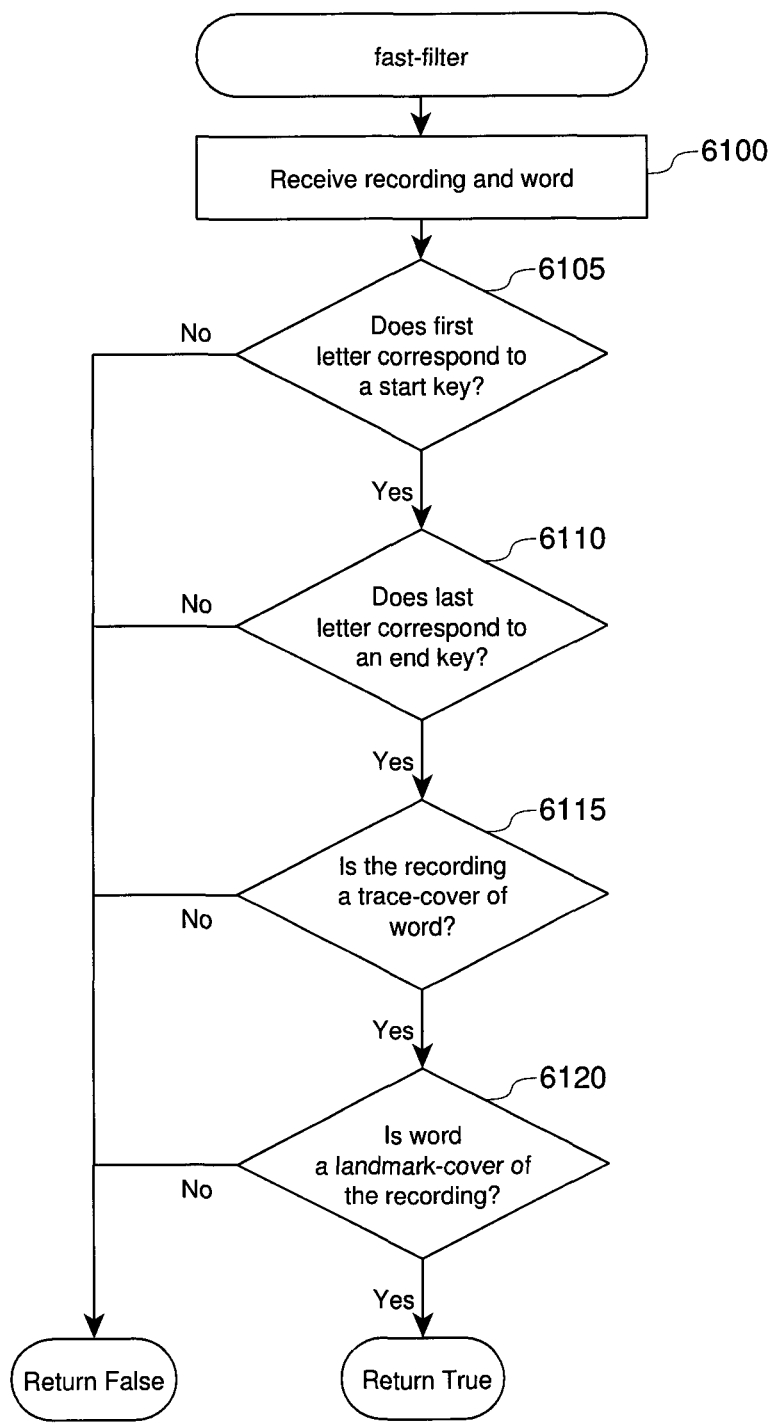
FIG. 6B is a flow diagram of a method of quickly determining if a word can match a recording, according to an exemplary embodiment of the disclosure.

FIG. 6B is a flowchart of the fast-filter method in accordance with an embodiment of the disclosed subject matter.

In accordance with an embodiment at block 6100, the method receives the recording and a normalized word.

In accordance with an embodiment at block 6105, the method tests if the first character of the word corresponds to a start key of the recording; if not, the method returns control with False as result.

In accordance with an embodiment the fast filter tests if the last character of the word corresponds to an end key. In one embodiment of the disclosed subject matter, an end key is a neighboring key of the last trace key of any trace with an end time later than the start time of the ending trace of a recording. This definition enables the user to end contact with the touch screen with either finger first. It allows for a natural and more relaxed user experience. It also means the last character of a word need not correspond to the location or time of the last point of contact with the touch screen.

In accordance with an embodiment at block 6110, the method tests if the last character of the word corresponds to an end key of the recording; if not, the method returns control with False as result.

In accordance with an embodiment at block 6115, the method tests if the recording is a trace cover of the normalized word; if not, the method returns control with False as result.

In accordance with an embodiment, a collection of traces $s_t$ is a trace cover of a normalized word w, if for each character c in w, there exists a trace key k in a trace in $s_t$, such that c is the main character of a neighboring key of k; the method may compute if the recording is a trace cover of the normalized word by way of any appropriate process.

In accordance with an embodiment at block 6120, the method tests if the normalized word is a landmark cover of the recording; if not, the method returns control with False as result.

In accordance with an embodiment, a normalized word w is a landmark cover of a collection of traces $s_t$, if for each landmark key k in a trace in $s_t$, there exists a character c in w, such that c is the main character of a neighboring key of k; the method may compute if the normalized word is a landmark cover of the recording by way of any appropriate process.

Finally, In accordance with an embodiment the method returns control with True as the result.

The following pseudo code describes the logic of a possible embodiment of the method.

TABLE 10

```
fast-filter(string word, trace[ ] traces):
  1. if word[0] not in start-keys-of(traces):
  2.     return false
  3.
  4. if word[length(word)−1] not in end-keys-of(traces):
  5.     return false
  6.
  7. int i = 1
  8. while i < length(word) − 1:
  9.     if word[i] not in cover-of(traces):
 10.         return false
 11.
 12. set landmarks = new set
 13. for char c in word:
 14.     for key l in get-landmarks-covered-by-char(c, traces):
 15.         landmarks += l
 16. if length(landmarks) < length(get-landmarks(traces)):
 17.     return false
 18.
 19. return true
```

The match method of the evaluation module In accordance with an embodiment the match method determines if and how well a normalized word matches a collection of traces.

In accordance with an embodiment, the method computes recursively all matches between an input string and an input collection of traces; the method scores each match and outputs the best score.

In accordance with an embodiment, the input string is assumed to be a normalized string and the collection of traces is assumed to consist of traces having distinct start times.

In accordance with an embodiment, a match between a string and a collection of traces may be seen as a mapping from characters of the string into trace keys of the collection of traces that satisfies the following conditions:

1. A character in the input string may be matched to (mapped to) a trace key if and only if it is the main character of a neighboring key of the trace key.
2. All landmark keys in the collection of traces must be matched to (mapped from) characters in the input string.
3. A single trace key may only be matched to a single character, or multiple instances of the same character.
4. For each pair of trace keys that are matched to characters of the input string, if the trace keys are ordered in respect to each other, that order must be preserved by the corresponding characters in the input string.

In accordance with an embodiment, the following partial order relation is defined on trace keys in a collection of traces:

1. Within a trace, all trace keys are naturally ordered in respect to each other.
2. If a trace A ends before a trace B starts, then the trace keys of A precede the trace keys of B.
3. If a trace A starts before a trace B starts, then the first trace key of A precedes the trace keys of B.

It is noted that the described set of conditions and the definition of the order relation were chosen since they balance simplicity of implementation, matching accuracy and usability; however, the conditions and/or order relation may be modified in various ways to produce different system behavior. For example, the third statement of the order relation definition may be modified to "If a trace A starts t milliseconds or more before a trace B starts . . . " to increase matching freedom; notably, this will affect the definition of the start key, and may remove the requirement for distinct start times of the input collection of traces. For another example, the system may be modified to allow a letter not to match any trace key, to make the system tolerant to missing letters. On the other hand, more conditions may be introduced, for example, the system may record the time of landmarks and use it for ordering trace keys.

It is noted that the definitions of the start key, end key, trace cover and landmark cover are derived from the described set of conditions and the definition of the order relation, and that an embodiment of the disclosed subject matter may use and implement different definitions. For example, and end key may be defined to include only neighboring keys associated with the last trace key of the ending trace in a recording, or a start key may be defined to include neighboring keys associated with the first trace key of any trace with a start time that is early enough in the recording.

In accordance with an embodiment, the method uses a working set of traces to keep track of the matching conditions efficiently; the working set is a data structure consisting of traces, and for each trace an indication of the latest trace key and the character of the input string that were matched.

In accordance with an embodiment, a trace in the working set is said to be consumed if its last trace key was matched, and a working set is said to be empty if it has no unconsumed traces; the method may remove a consumed trace from the working set.

In accordance with an embodiment, the trace keys following the latest matched trace key in a trace are said to be unmatched.

In accordance with an embodiment, the method may only add a trace to the working set if its trace keys are not ordered in respect to unmatched trace keys in the working set.

In accordance with an embodiment, the trace keys of a trace in the working set, starting with the latest matched trace key and ending with the first following unmatched landmark key, are said to be matchable.

In accordance with an embodiment, to compute a match recursively, the method matches the first character of the input string to a matchable trace key, and then matches the rest of the string recursively, which is a strictly smaller sub problem.

Figure 6C:
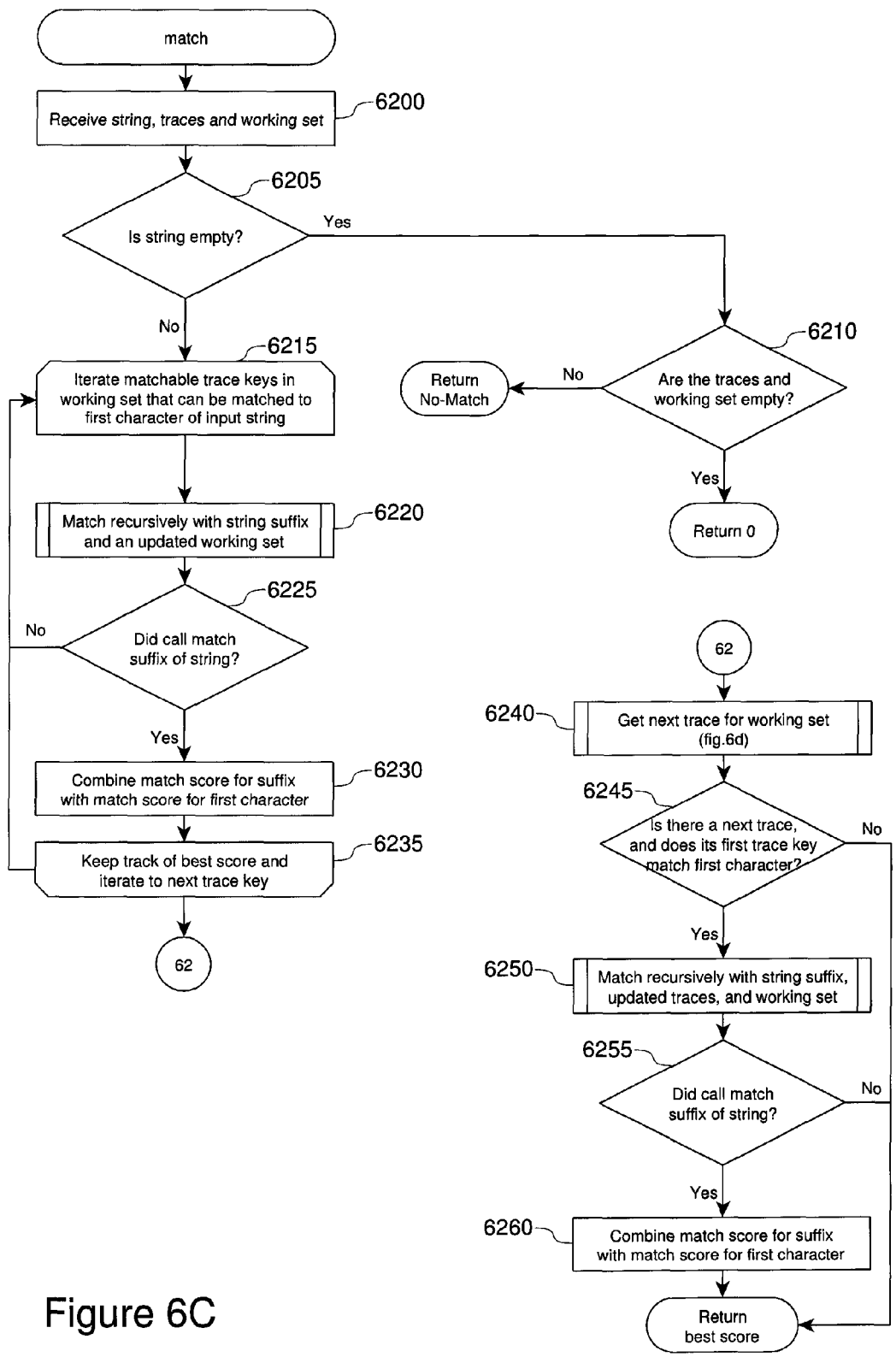
FIG. 6C is a flow diagram of a method of determining a score for a word matching a recording, according to an exemplary embodiment of the disclosure.

FIG. 6C is a flowchart of the match method in accordance with an embodiment of the disclosed subject matter.

In accordance with an embodiment at block 6200, the method receives a string, a collection of traces, and a working set.

In accordance with an embodiment, the method expects a normalized string and a collection of traces having distinct start times; when the evaluation method calls the match method it sends a normalized word, the recording, and an empty working set.

In accordance with an embodiment at block 6205, the method tests if the string is empty; if not, the method proceeds to block 6215.

In accordance with an embodiment at block 6210, the method tests if the working set and the collection of traces are empty; if so, the method returns control with a score of zero corresponding to the trivial match, otherwise it returns control with a value indicating no-match, since the remaining trace keys cannot be matched to an empty string.

In accordance with an embodiment, the trace keys of a trace in the working set, starting with the latest matched trace key and ending with the first following unmatched landmark key, are said to be matchable trace keys.

In accordance with an embodiment at block 6215, the method iterates the matchable trace keys in the working set, skipping trace keys that cannot be matched to the first character of the input string.

It is noted that in accordance with an embodiment when the evaluation module calls the method it sends an empty working set, and therefore no trace keys are initially iterated, and control proceeds to block 6240 to add the earliest trace to the working set.

It is noted that in accordance with an embodiment while the latest matched trace key of a trace remains matchable, it may only be matched to a new instance of the same character with which it is already matched. For example FIG. 1E illustrates two strokes 190, 195 corresponding to the word 'again'; the method matches the third letter of the word, the letter 'a', to the keystroke on the left 190 again, after it has already matched the first letter of the word with that keystroke.

In accordance with an embodiment at block 6220, the method makes a copy of the working set and updates it to indicate the trace key and the first character of the string matched to it, and then calls recursively the match method with the rest of the string and the updated working set.

In accordance with an embodiment at block 6225, the method tests if the recursive call matched the suffix of the string; if not, the method proceeds to the next match iteration at block 6215.

In accordance with an embodiment at block 6230, the method scores the match of the first character of the input string with the iteration trace key, and combines it with the score for the suffix of the string.

In accordance with an embodiment, the method scores the match with 20 points if the first character of the input string corresponds to the keyboard key of the matched trace key, and with another 20 points if the trace key is a landmark key, and then the method adds the score computed by the recursive call.

In accordance with an embodiment of the disclosed subject matter, the method may use additional and/or different scoring schemes. For example, the method may keep track of the distance of each neighboring key from the path segment corresponding to the trace key and score a match based on that distance. For example, the method may penalize the match if the path distance traversed since the previously matched trace key, is significantly longer than the Euclidean distance between the locations of the corresponding keyboard keys, and so on.

In accordance with an embodiment at block 6235, the method keeps track of the best score so far, and proceeds to the next iteration at block 6215.

In accordance with an embodiment when the method finishes iterating the matchable trace keys of the working set, it tries to expand the working set with a new trace from the collection of traces. More specifically, the method finds the trace with the earliest start time in the collection of traces, and if its trace keys are not ordered in respect to unmatched trace keys in the working set, the method removes the trace from the collection of traces and adds it to the working set.

In accordance with an embodiment at block 6240, the method calls the get-next-trace method (FIG. 6D), to compute if it may move the earliest trace in the input collection of traces, to the working set.

In accordance with an embodiment at block 6245, the method tests if it may move the earliest trace, and if its first trace key can be matched to the first character of the input string; if not, the method returns control to the caller with the best score so far or a value indicating no-match.

In accordance with an embodiment at block 6250, the method removes the earliest trace from the input collection of traces, adds it to the working set, and indicates its first trace key is matched to the first character of the input string; then the method calls the match method recursively with the rest of the input string, the updated collection of traces and the updated working set.

In accordance with an embodiment at block 6255, the method tests if the recursive call matched the suffix of the string; if not, the method returns control to the caller with the best score so far or a value indicating no-match.

In accordance with an embodiment at block 6260, the method scores the match of the first character of the input string with the iteration trace key, and combines it with the score for the suffix of the string.

In accordance with an embodiment, the method then returns control with the best score so far or a value indicating no-match.

In accordance with an embodiment of the disclosed subject matter, the structure of the described recursion may be modified in various ways. For example, the method may use tail recursion and compute the score of the entire match branch at the stop condition of the recursion; for example, the method may be modified from recursion to iteration, and so forth.

In accordance with an embodiment of the disclosed subject matter, the method may compute a function of the match scores other than the best score; for example, the sum of all scores, or an average of the scores, or any other appropriate function.

The following pseudo code describes the logic of a possible embodiment of the method; it uses the PYTHON language notation for sequence slicing, for example, str[1:] is the proper suffix of str starting with the second character. The pseudo code assumes the traces in remaining-traces are sorted by their start times.

TABLE 11

```
match(string str, trace[ ] remaining-traces, work-trace[ ] working-set):
1. if length(str) == 0:
2.     if length(remaining-traces) > 0:
3.         return -1
4.     for work-trace wo in working-set:
5.         if length(wo.trace) > wo.index + 1:
6.             return -1
7.     return 0
8.
9. score = -1
10. char c = str[0]
11.
12. int i = 0
13. while i < length(working-set):
14.     work-trace wo = working-set[i]
15.     if c not in cover-of(wo.trace.):
16.         i++
17.         continue
18.
19.     int j = wo.index
20.     if c != wo.char:
21.         j++
22.
23.     while j < length(wo.trace.keys):
24.         trace-key tk = wo.trace.keys[j]
25.         if c in tk.neighbors:
26.             work-trace[ ] working-set0 = copy(working-set)
27.             working-set0[i].index = j
28.             working-set0[i].char = c
29.
30.             int score0 = match(str[1:], remaining-traces,
                                   working-set0)
31.             if score0 > -1:
32.                 if c equals tk.key:
33.                     score0 += 20
34.                     if tk.landmark:
35.                         score0 += 20
36.                 score = max(score, score0)
37.
38.         if j > wo.index and tk.landmark:
39.             break
40.         j++
41.     i++
42.
43. if not get-new-work-trace(traces, working-set):
44.     return score
45.
46. trace t = remaining-traces[0]
47. if c not in t.keys[0].neighbors:
48.     return score
49.
50. work-trace wo = new work-trace
51. wo.trace = t
52. wo.index = 0
53. wo.char = c
54. working-set.append(wo)
55.
56. int score0 = match(str[1:], remaining-traces[1:], working-set)
57. if score0 > -1:
58.     if c equals trace.key:
59.         score0 += 40
60.     score = max(score, score0)
61.
62. return score
```

The Get-Next-Trace Method of the Evaluation Module 344:

The method tests if the trace having the earliest start time in the collection of traces may be added to the working set in accordance with an embodiment.

Figure 6D:
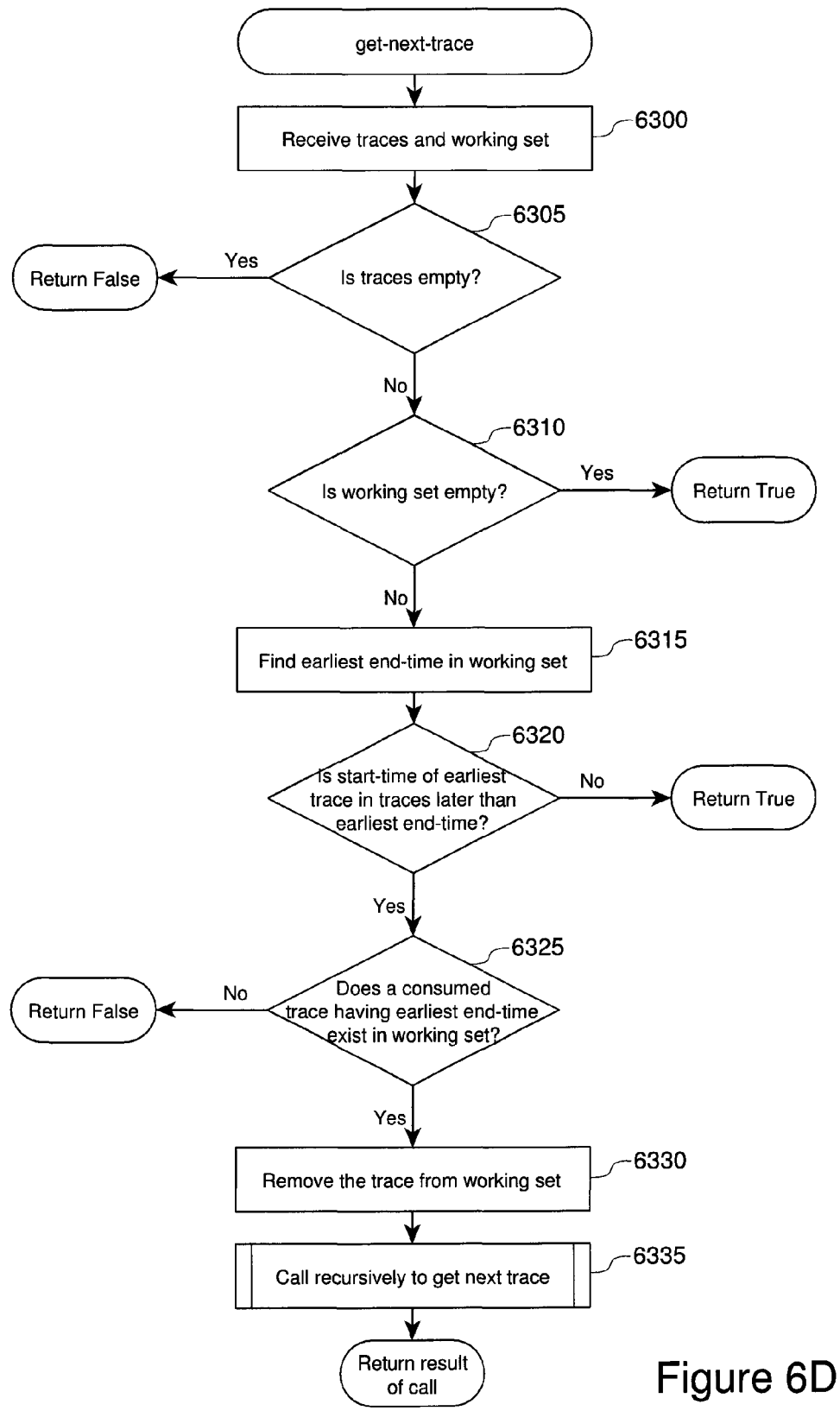
FIG. 6D is a flow diagram of a method of determining if a trace structure with the earliest start time should be added to a recording, according to an exemplary embodiment of the disclosure.

FIG. 6D is a flowchart of the get-next-trace method in accordance with an embodiment of the disclosed subject matter.

In accordance with an embodiment at block 6300, the method receives a collection of traces and a working set.

In accordance with an embodiment at block 6305, the method tests if the collection of traces is empty; if so, the method returns control with False as result.

In accordance with an embodiment at block 6310, the method tests if the working set is empty; if so, the method returns True as the result.

In accordance with an embodiment at block 6315, the method finds the earliest end time of a trace in the working set.

In accordance with an embodiment at block 6320, the method tests if the start time of the earliest trace in the input collection of traces is later than the earliest end time; if not, the method returns control with True as the result.

In accordance with an embodiment at block 6325, the method looks for a consumed trace in the working set, having the earliest end time; if the method finds none, it returns control with False as the result.

In accordance with an embodiment at block 6330, the method removes the consumed trace from the working set.

In accordance with an embodiment at block 6335, the method calls recursively the get-next-trace method (FIG. 6D).

Finally, in accordance with an embodiment the method returns control with the result from the recursive call.

The following pseudo code describes the logic of a possible embodiment of the method. The pseudo code assumes the traces in remaining-traces are sorted by their start times.

TABLE 12

```
get-next-trace(trace[ ] remaining-traces, work-trace[ ] working-set):
  1. if length(remaining-traces) == 0:
  2.         return false
  3.
  4. if length(working-set) == 0:
  5.         return true
  6. 33
  7. int end-time = working-set[0].trace.end
  8. for work-trace wo in working-set:
  9.         end-time = min(end-time, wo.trace.end)
 10.
 11. if remaining-traces[0].start <= end-time:
 12.         return true
 13.
 14. for work-trace wo in working-set:
 15.                if wo.trace.end == end-time and
wo.index + 1 >= length(wo.trace.keys):
 16.                working-set.remove(wo)
 17.                return get-new-work-trace(remaining-traces,
                        working-set)
 18.
 19. return false
```

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It is also to be understood that any of the methods described herein can include fewer, more and/or different stages than illustrated in the drawings, the stages can be executed in a different order than illustrated, stages that are illustrated as being executed sequentially can be executed in parallel, and/or stages that are illustrated as being executed in parallel can be executed sequentially. Any of the methods described herein can be implemented instead of and/or in combination with any other suitable techniques.

It is also to be understood that certain embodiments of the presently disclosed subject matter are applicable to the architecture of system(s) described herein with reference to the figures. However, the presently disclosed subject matter is not bound by the specific architecture; equivalent and/or modified functionality can be consolidated or divided in another manner and can be implemented in any appropriate combination of software, firmware and/or hardware. Those versed in the art will readily appreciate that the presently disclosed subject matter is, likewise, applicable to any suitable architecture implementing a text input system.

It is also to be understood that for simplicity of description, some of the embodiments described herein ascribe a specific method stage and/or task to a particular module within the system. However in other embodiments the specific stage and/or task can be ascribed more generally to the system, and/or more specifically to any module(s) in the system.

It is also to be understood that the system according to the presently disclosed subject matter can be, at least partly, a suitably programmed computer. Likewise, the presently disclosed subject matter contemplates a computer program being readable by a computer for executing the method of the presently disclosed subject matter. The subject matter further contemplates a machine-readable memory tangibly embodying a program of instructions executable by the machine for executing a method of the subject matter.

Those skilled in the art will readily appreciate that various modifications and changes can be applied to the embodiments of the presently disclosed subject matter as hereinbefore described without departing from its scope, defined in and by the appended claims.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of inputting a text word intended by a user in a computerized system using a virtual keyboard, comprising:
   recording two or more strokes, wherein in each stroke the user forms contact with the virtual keyboard and maintains contact forming a trace path traversing through multiple keyboard keys, representing letters of the word, wherein the user can enter as many letters of the word as desired in each stroke;
   identifying the word based on the recording; and
   wherein two or more distinct letters of the word are selected from the trace path of a first stroke of the two or more strokes and at least one letter of the word appearing between the letters selected from the first stroke is selected from a different stroke that overlaps temporally with the first stroke.

2. A method according to claim 1, wherein in each trace path, keys representing the letters of the word are traversed in the order of appearance in the word.

3. A method according to claim 1, wherein each of the keys representing letters of the word are traversed in the order of appearance in the word.

4. A method according to claim 1, wherein the first letter of the word is selected by an initial contact of one of the strokes with the virtual keyboard before contact by any other stroke.

5. A method of claim 1, further comprising a third stroke, wherein all the keys of a trace path formed by the third stroke that starts after completion of the first and second strokes are considered to represent letters of the word appearing after the letters represented by the keys of the trace paths of the first and second strokes.

6. A method according to claim 1, wherein end of input for the word is determined by releasing contact from the virtual keyboard.

7. A method according to claim 1, wherein end of input for the word is determined by selecting a delimiter key.

8. A method according to claim 1, wherein end of input for the word is determined by releasing contact from the virtual keyboard for more than a pre-selected time interval.

9. A method according to claim 1, wherein said identifying is performed during input of the trace paths and updated as the trace paths are formed.

10. A method according to claim 1, wherein the word is selected by comparing the letters of words from a word database to the letters represented by the keyboard keys in the trace paths that were input to select the word.

11. A method according to claim 10, wherein the letters of words from the word database are normalized to compare the main character of the key that represents the letter with the recorded trace paths.

12. A method according to claim 1, wherein every letter in the word is represented by traversal of a key in one of the trace paths.

13. A method according to claim 1, wherein the identified word includes all landmark keys of the recording, wherein a landmark key is a key that was indicated as participating in the word with a higher probability than other keys.

14. An electronic device for inputting a text word intended by a user, comprising:
   a processor;
   memory;
   a touch sensitive screen;
   a virtual keyboard displayed on the touch sensitive screen;
   an operating system that is executed by the processor in the memory and is capable of inputting multiple points of contact with the virtual keyboard simultaneously;
   a text input program executed by the processor in memory;
   wherein the text input program is programmed to:
   record two or more strokes, wherein in each stroke the user forms contact with the virtual keyboard and maintains contact forming a trace path traversing through multiple keyboard keys, representing a-letters of the word, wherein the user can enter as many letters of the word as desired in each stroke;
   identify the word based on the recording; and
   wherein two or more distinct letters of the word are selected from the trace path of a first stroke of the two or more strokes and at least one letter of the word appearing between the letters selected from the first stroke is selected from a different stroke that overlaps temporally with the first stroke.

15. A device according to claim 14, wherein in each trace path, keys representing the letters of the word are traversed in the order of appearance in the word.

16. A device according to claim 14, wherein each of the keys representing letters of the word are traversed in the order of appearance in the word.

17. A device according to claim 14, wherein the first letter of the word is selected by an initial contact with the virtual keyboard.

18. A non-transitory computer readable storage medium containing a set of instructions for a computerized system, to perform the method of claim 1.

* * * * *